United States Patent
Sharpe, Jr. et al.

[11] Patent Number: 5,960,214
[45] Date of Patent: Sep. 28, 1999

[54] INTEGRATED COMMUNICATION NETWORK FOR USE IN A FIELD DEVICE MANAGEMENT SYSTEM

[75] Inventors: Richard R. Sharpe, Jr., Lakeville; Craig R. Tielens, Minneapolis; Jon D. Westbrock, Richfield, all of Minn.

[73] Assignee: Fisher-Rosemount Systems, Inc., Austin, Tex.

[21] Appl. No.: 08/759,387

[22] Filed: Dec. 4, 1996

Related U.S. Application Data

[63] Continuation of application No. 08/599,371, Feb. 6, 1996.

[51] Int. Cl.$^6$ .................................................. G05B 19/042
[52] U.S. Cl. .......................... 395/835; 395/681; 395/683; 364/138
[58] Field of Search ..................... 395/681, 683, 395/831, 651, 835, 836, 837, 838, 839; 364/130, 132, 138

[56] References Cited

U.S. PATENT DOCUMENTS

| Re. 33,162 | 2/1990 | Yoshida et al. .......................... 364/492 |
| 3,665,172 | 5/1972 | Speargaren .......................... 235/150.1 |
| 4,006,464 | 2/1977 | Landell ................................ 340/172.5 |

(List continued on next page.)

FOREIGN PATENT DOCUMENTS

| 0 434 288 A2 | 6/1991 | European Pat. Off. . |
| 0 434 986 A2 | 7/1991 | European Pat. Off. . |
| 0 560 226 A2 | 9/1993 | European Pat. Off. . |
| 2 692 701 | 12/1993 | France . |
| 2 713 360 | 6/1995 | France . |
| 42 10 376 A1 | 10/1992 | Germany . |
| WO 95/04314 | 2/1995 | WIPO . |
| WO 95/09387 | 4/1995 | WIPO . |
| WO 95/26527 | 5/1995 | WIPO . |
| WO 96/07957 A1 | 3/1996 | WIPO . |
| 9607957A1 | 3/1996 | WIPO . |

OTHER PUBLICATIONS

Fisher, "Fieldvue Instruments: Opening A Window To The Process," *Fisher Controls International, Inc.*, pp. 1–8 (1994).

Fisher, "Fieldvue Digital Valve Controller Type DVC5000 Series," *Fisher Controls International, Inc.*, Bulletin 62.1:DVC5000, pp. 1–12 (Jun. 1994).

Fisher, "Fieldvue Digital Valve Controller Type DVC5000 Series Remotely Accessible Information," *Fisher Controls International, Inc.*, Bulletin 62.1:DVC5000(S1), pp. 1–2 (Jun. 1994).

Fisher, "Fieldvue Digital Transducer DT4000 Remotely Accessible Information," *Fisher Controls International, Inc.*, Bulletin 62.1:DT4000(S1), pp. 1–2 (Jun. 1994).

(List continued on next page.)

*Primary Examiner*—Dinh C. Dung
*Attorney, Agent, or Firm*—Marshall, O'Toole, Gerstein, Murray & Borun

[57] ABSTRACT

A field device management system includes an interface which provides communication between a software application implemented on the system and a set of smart field devices coupled to the system. The interface accesses information from and/or writes information to the smart field devices, a database and device descriptions associated with the smart field devices to provide a consistent communication connection with such devices, database and device descriptions, irrespective of the types of smart field devices connected to the system. The interface is based on a predefined hierarchy of categories of information defining the device data associated with the smart field devices, and is implemented using an OLE object for each of the predefined categories of information. In particular, each OLE object stores device data associated with one of the predefined categories of information and includes instructions for communicating with one of the smart field devices, one of the device descriptions and/or the database to effect a command related to the stored device data.

29 Claims, 6 Drawing Sheets

5,960,214
Page 2

U.S. PATENT DOCUMENTS

| | | | |
|---|---|---|---|
| 4,047,003 | 9/1977 | LaRocca et al. | 235/151.11 |
| 4,096,566 | 6/1978 | Borie et al. | 364/200 |
| 4,195,344 | 3/1980 | Yamazaki | 364/200 |
| 4,368,510 | 1/1983 | Anderson | 364/151 |
| 4,413,314 | 11/1983 | Slater et al. | 364/188 |
| 4,443,861 | 4/1984 | Slater | 364/900 |
| 4,517,637 | 5/1985 | Cassell | 364/138 |
| 4,571,676 | 2/1986 | Mantellina et al. | 364/200 |
| 4,589,063 | 5/1986 | Shah et al. | 364/200 |
| 4,602,343 | 7/1986 | Dougherty | 364/505 |
| 4,628,437 | 12/1986 | Poschmann et al. | 364/131 |
| 4,639,852 | 1/1987 | Motomiya | 364/138 |
| 4,641,269 | 2/1987 | Japenga et al. | 364/473 |
| 4,648,064 | 3/1987 | Morley | 364/900 |
| 4,663,704 | 5/1987 | Jones et al. | 364/188 |
| 4,672,529 | 6/1987 | Kupersmit | 364/130 |
| 4,680,753 | 7/1987 | Fulton et al. | 370/85 |
| 4,682,158 | 7/1987 | Ito et al. | 340/679 |
| 4,704,676 | 11/1987 | Flanagen et al. | 364/146 |
| 4,774,656 | 9/1988 | Quatse et al. | 364/900 |
| 4,777,584 | 10/1988 | Pogue | 364/146 |
| 4,825,404 | 4/1989 | Theus | 364/900 |
| 4,864,489 | 9/1989 | Yasuhara et al. | 364/131 |
| 4,910,658 | 3/1990 | Dudash et al. | 364/138 |
| 4,910,691 | 3/1990 | Skeirik | 364/513 |
| 4,965,742 | 10/1990 | Skeirik | 364/513 |
| 4,965,880 | 10/1990 | Petitjean | 364/468 |
| 5,068,778 | 11/1991 | Kosem et al. | 364/138 |
| 5,095,417 | 3/1992 | Hagiwara et al. | 364/138 |
| 5,115,511 | 5/1992 | Nilsson et al. | 395/800 |
| 5,121,318 | 6/1992 | Lipner et al. | 364/146 |
| 5,122,948 | 6/1992 | Zapolin | 364/131 |
| 5,124,908 | 6/1992 | Broadbent | 364/188 |
| 5,140,677 | 8/1992 | Fleming et al. | 395/159 |
| 5,146,401 | 9/1992 | Bansal et al. | 364/138 |
| 5,164,894 | 11/1992 | Cunningham-Reid et al. | 364/131 |
| 5,168,441 | 12/1992 | Onarheim et al. | 364/146 |
| 5,202,961 | 4/1993 | Mills et al. | 395/159 |
| 5,208,744 | 5/1993 | Kanda | 364/162 |
| 5,233,510 | 8/1993 | Brueckner et al. | 364/131 |
| 5,247,450 | 9/1993 | Clark | 364/473 |
| 5,251,125 | 10/1993 | Karnowski et al. | 364/189 |
| 5,265,005 | 11/1993 | Schmidt et al. | 364/147 |
| 5,282,128 | 1/1994 | Braude | 364/148 |
| 5,289,365 | 2/1994 | Caldwell et al. | 364/138 |
| 5,307,491 | 4/1994 | Feriozi et al. | 395/681 |
| 5,309,556 | 5/1994 | Sismilich | 395/161 |
| 5,311,451 | 5/1994 | Barrett | 364/550 |
| 5,317,723 | 5/1994 | Heap et al. | 395/500 |
| 5,319,751 | 6/1994 | Garney | 395/442 |
| 5,323,328 | 6/1994 | Tanaka | 364/492 |
| 5,365,423 | 11/1994 | Chand | 364/140 |
| 5,371,895 | 12/1994 | Bristol | 395/800 |
| 5,377,315 | 12/1994 | Leggett | 395/140 |
| 5,384,910 | 1/1995 | Torres | 395/156 |
| 5,392,389 | 2/1995 | Fleming | 395/159 |
| 5,394,522 | 2/1995 | Sanchez-Frank et al. | 395/159 |
| 5,406,176 | 4/1995 | Sugden | 315/292 |
| 5,408,603 | 4/1995 | Van de Lavoir et al. | 395/161 |
| 5,412,643 | 5/1995 | Kogure | 370/24 |
| 5,420,977 | 5/1995 | Sztipanovits et al. | 395/160 |
| 5,426,732 | 6/1995 | Boies et al. | 395/161 |
| 5,428,734 | 6/1995 | Haynes et al. | 395/159 |
| 5,437,007 | 7/1995 | Bailey et al. | 395/159 |
| 5,444,642 | 8/1995 | Montgomery et al. | 364/550 |
| 5,452,201 | 9/1995 | Pieronek et al. | 364/18 |
| 5,459,825 | 10/1995 | Anderson et al. | 395/133 |
| 5,459,867 | 10/1995 | Adams et al. | 395/651 |
| 5,461,710 | 10/1995 | Bloomfield et al. | 395/161 |
| 5,465,364 | 11/1995 | Lathrop et al. | 395/681 |
| 5,485,400 | 1/1996 | Warrior et al. | 364/550 |
| 5,486,998 | 1/1996 | Corso | 364/152 |
| 5,497,316 | 3/1996 | Sierk et al. | 364/140 |
| 5,500,934 | 3/1996 | Austin et al. | 395/755 |
| 5,586,324 | 12/1996 | Sato et al. | 395/652 |
| 5,613,123 | 3/1997 | Tsang et al. | 395/651 8 |

OTHER PUBLICATIONS

Fisher, "Type VL1000 Fieldvue Valve Link," *Fisher Controls International, Inc.*, Bulletin 62.1:VL1000, pp. 1–2 (Jun. 1994).

Fisher, "Fieldvue Digital Transducer Type DT4000," *Fisher Controls International, Inc.*, Bulletin 62.1:DT4000, pp. 1–12 (Jun. 1994).

Fisher, "Type HF100 Fieldvue HART Filter Instruction Manual," *Fisher Controls International*, Form 5340, pp. 1–6 (Dec. 1993).

Fisher, "HART Communicator Manual for Fieldvue Instruments," *Fisher–Rosemount*, Form 5345, pp. 1–40 (Apr. 1995).

Fisher, "Fieldvue Digital Valve Controller Type DVC5000 Series," *Fisher–Rosemount*, Form 5335, pp. 1–38 (Jun. 1995).

Fisher, "Fieldvue Digital Transducer Type DT4000," *Fisher–Rosemount*, Form 5334 pp. 1–24 (Jun. 1995).

ISP, "InterOperable Systems (ISP) Device Description Services (DDS) User's Guide," ISP–94–110, Rev. 1.0, 60 pages (Jun. 1984).

ISP, "InterOperable Systems, Project Fieldbus Specification Device Description Language," *ISP Foundation*, pp. 1–101 (Dec. 1993).

Leeney, "Instrument Remotely Verifies Valve's Stem Position," *Chemical Processing*, Form 8238, pp. 1–2 (Dec. 1993).

PCT International Search Report mailed Jun. 30, 1997, 4 pgs.

PCT International Search Report mailed Jun. 20, 1997, 4 pgs.

Arnold, et al., "Object–Oriented Design Environments in Process Control," 813 Advance in Instrumentation and Control 44(1989), Part 3.

Fisher, "Fieldvue ValveLink Series VL2000 Software," Bulletin 62.1:VL2000, *Fisher Controls International, Inc.*, pp. 1–6 (Nov. 1995).

Fisher, "PC–Based Communications Program," ProLink Software, Product Data Sheet PS–00033, *Micro Motion, Inc.*, 2 pages (Nov. 1995).

Fisher, "Cornerstone Base Station," Model 2500H1, Product Data Sheet PDS 4693, *Fisher–Rosemount Systems, Inc.*, pp. 1–8 (Sep. 1995).

ISP, "InterOperable Systems Project (ISP) Device Description Services (DDS) User's Guide," ISP–94–110, Rev. 1.0, 54 pages (Jun. 1994).

INTEGRATED COMMUNICATION NETWORK FOR USE IN A FIELD DEVICE MANAGEMENT SYSTEM

RELATED APPLICATION

This application is a continuation of U.S. patent application Ser. No. 08/599,371, entitled "System and Method for Managing a Transaction Database of Records of Changes to Field Device Configurations," filed Feb. 6, 1996.

TECHNICAL FIELD

The present invention relates generally to management systems having applications that manage "smart" field devices within a process or a plant and, more particularly, to a communication network capable of communicating with one or more smart field devices within a process.

BACKGROUND ART

Typically, process plants (such as chemical refinery plants and drug manufacturing plants, for example) include many field devices which control and measure parameters within the process. Each field device may be a control device (such as a flow valve controller), a measurement device (such as a temperature gauge, pressure gauge, flow meter, etc.) and/or any other device that affects or determines a value associated with a process. Until the past decade or so, field devices have typically been rather simple devices which are controlled either manually or electronically and which produce output readings either electronically or on a gauge connected to the device. However, these devices typically only provide limited information to a controller such as analog signals pertaining to the readings or measurements made by these devices.

More recently, so called "smart" field devices have been developed. Smart field devices are capable of communicating with a process controller and/or a management system associated with the device. Typical smart field devices are capable of transmitting an analog signal indicative of the value associated with the device, for example, a measurement value, and of storing and also digitally transmitting detailed device-specific information, including calibration, configuration, diagnostic, maintenance and/or process information. Some smart devices may, for example, store and transmit the units in which the device is measuring, the maximum ranges of the device, whether the device is operating correctly, troubleshooting information about the device, how and when to calibrate the device, etc. Furthermore, a smart field device may be able to perform operations on itself, such as self-tests and self-calibration routines. Exemplary smart devices include devices which follow the HART (Highway Addressable Remote Transducer) protocol (HART devices), the Fieldbus protocol (Fieldbus devices), the Modbus protocol, and the DE protocol. However, other smart device protocols may exist or be developed in the future to support different types of smart devices.

Currently, every conventional and smart device is capable of performing one or more specific input and/or output functions with respect to a process. An input function is any function which measures or reads a value associated with a process, such as the function performed by a temperature or pressure measurement device. An output function is any function that changes something within a process, such as the functions performed by a valve or a flow controller. Furthermore, some smart devices, such as Fieldbus devices, can perform control functions which are functions associated with the control of a process. Each input, output and control sub-function performed by a device is referred to as a "block." By definition, therefore, each device includes at least one and maybe more blocks. Fieldbus devices usually include multiple blocks (e.g., one or more input, output, and control blocks), and, while HART devices do not include blocks per se, the contents of a HART device may be conceptualized as constituting one and only one block.

Each block and, therefore, each device includes one or more "parameters." A parameter is an attribute of a block which characterizes, affects or is somehow otherwise related to the block. Parameters may include, for example, the type of the block, the maximum operating or measurement range of a block, the mode of a block, the value of a block measurement, etc.

Likewise, each parameter has one or more properties associated therewith, and each of those properties defines or describes the information within the parameter. For example, the temperature parameter of a temperature measuring device has a label property which stores the name of the parameter (e.g., "temperature"), a value property which stores the value of the parameter (e.g., the actual measured temperature), and a units property which stores the units in which the temperature value is expressed (e.g., degrees centigrade or degrees fahrenheit). A device or a block configuration comprises a set of values for each of the properties of each of the parameters associated with a device or a block.

As noted above, smart field devices are developed so that communication therewith must be performed in one of several available protocols (the HART and Fieldbus protocols, for example). These protocols allow device manufacturers to provide device-specific types of information for a device and, of course, the particular types of information are different for each type of smart field device. Consequently, these protocols are complex and difficult to use in device programming. More particularly, some of these protocols do not provide a completely consistent method for communicating with every smart device conforming thereto. Instead, these protocols, such as the HART protocol, merely provide a way for device manufactures to specify what information is available from each smart field device and how to retrieve that information.

Communication with smart devices has been simplified to some extent with the advent of device description languages (DDL) and device description services (DDS) which are provided by the manufacturers of smart field devices. A DDL is a human-readable language that provides a protocol for describing the data available from a smart device, the meaning of the data associated with the smart device and retrieved therefrom, the methods available for implementation of the smart device, the format for communicating with the smart device to obtain data, user interface information about the device (such as edit displays and menus), and data necessary for handling or interpreting other information pertaining to a smart device.

DDL source files comprise human-readable text written by device developers. These files specify all the information available about a device between the device and a bus or a host to which the device is connected. Basically, in developing a DDL source file for a device, a developer uses the DDL language to describe core or essential parameter characteristics of the device as well as to provide group-specific, and vendor-specific definitions relating to each block, parameter, and special feature of a smart device.

A DDL source file is compiled into a binary format to produce a machine-readable file known as a device description (DD) which can be provided to a user by the device manufacturer or a third-party developer to be stored in a host system, such as a management system. In some cases, for example in Fieldbus devices, DDL source files may be stored in a smart device and transferred from the smart device to a host system. When the host system receives a DD object file for a smart device, it can decode and interpret the DD to derive a complete description of the interface with the device.

DDS is a general software system developed and provided by Fisher-Rosemount Systems, Inc. and/or Rosemount, Inc. for automatically decoding and interpreting the DD's of smart devices. More particularly, DDS is a library of routines which, when called by a host, interprets the DD of a smart device to provide the host with information pertaining to the smart device, including information pertaining to: (1) the setup and configuration of the smart device; (2) communication with the smart device; (3) user interfaces; and (4) methods available for use in conjunction with the smart device. One extremely useful application of DDS is in providing a consistent interface between a host system and one or more smart devices having associated DDL source files (and corresponding DD object files).

Although DDS, DDL and DD's are generally known in the art, more information pertaining to the specific function and format of DDL's, and of Fieldbus DDL in particular, can be found in the InterOperable Systems Project Foundation's manual entitled "InterOperable Systems Project Fieldbus Specification Device Description Language" (1993), which is hereby incorporated by reference herein. A similar document pertaining to the HART DDL is provided by the HART foundation.

A management system is a system which interacts with one or more smart field devices to read any of the device, block, parameter, variable, or configuration information associated with those devices. Typically, a management system comprises a personal computer having appropriate communication ports which allow it to interconnect to, communicate with, and reconfigure a smart device. Management systems may be on-line, that is, have a hard-wired or any other permanent connection with a smart device. Management systems may also be portable and capable of being periodically connected to a smart device to reconfigure that smart device.

Management systems typically perform a wide variety of functions with respect to smart devices within a system. For example, management systems may be used to provide users with information (e.g., values of variables or parameters) pertaining to the state of a process and to each of the smart field devices associated with or connected to the process. Management systems may also be used to enable a user to monitor a process and control the process by reconfiguring smart devices within the process as necessary.

The software routines which are used to perform functions within a management system using features provided by the system are generally referred to as applications. Typically, management systems implement applications provided by individual smart device manufacturers to implement changes on, and read data from, a particular smart device. As a result, various applications within a management system often do not share a common or consistent interface, and the transition from one application to another is therefore cumbersome and time-consuming. Further, smart device configuration data, configuration logs, and smart device diagnostic data created and stored by different applications are decentralized and cannot be cross-referenced because this data may be stored in diverse formats, in different databases and, in some cases, in proprietary formats. Consequently, tasks that could be common to each device within a system must be duplicated in separate applications.

A management system which implements such separately developed applications typically has no way to view information pertaining to all the smart devices in a plant or a process simultaneously because the applications for each device must be run separately. Furthermore, it is difficult for users to write applications that provide a comprehensive view of data pertaining to multiple, different devices in a process because users typically do not have a great familiarity with DDS or with the DDL and DD's associated with each of the devices within a process. Even if a user does have such familiarity, such applications are time-consuming and expensive to develop and must be updated each time a new smart device is added to the system.

The need for an integrated management system is particularly great in processes or systems which must be certified by government agencies such as the EPA and the FDA which regulate, for example, certain chemical and pharmaceutical processes to ensure that the products manufactured by those processes meet stringent standards, that emissions remain below a predetermined level and that safety procedures are followed. The easiest way for a plant implementing a regulated process to maintain its certification is to maintain records sufficiently thorough to prove to government auditors that the values of critical process parameters have remained at specified levels or within specified ranges that comply with the regulatory requirements of interested governmental agencies and safety procedures. An integrated management system coupled to the smart devices of a process can be used to automatically record these values in a database. Thereafter, the data stored in the database of the integrated management system can be used to prove that these critical values remained within respective required ranges.

Integrated management systems also can be used to reconfigure smart devices more regularly to maintain the certifiability of the process in which the devices are used. Currently, most management systems which support more than one smart field device include particularized software written for each supported smart device to allow communication with that smart device. Adding a new smart device to a process therefore requires the management system for that process to be reprogrammed. Once again, this programming is time-consuming and can be expensive because it must be performed by a person knowledgeable not only in the management system software, but also in the smart device protocol and the new smart device.

Although hand held communicators exist which interface with different smart devices following a particular protocol, these devices only read and write data from and to the device and are not capable of processing that data in any significant manner.

Still further, applications typically allow a user to view a current configuration of a device, block, or parameter within a process, but those applications do not allow the user to view past configurations or to display multiple configurations simultaneously to compare such configurations.

SUMMARY OF THE INVENTION

This invention is related to a management system which provides a consistent and generalized communication connection between an application and multiple devices connected to the system so that no new programming is necessary to communicate with, and display information pertaining to, a newly added smart device. In particular, a hierarchy is created to identify and categorize all of the types of information and data represented by one or more DDL's associated with one or more smart devices connected within a system and the interrelationships between those categories of information and data. An interface based on this hierarchy is then used to call, access information from, and communicate with a DDS associated with the one or more categorized DD's, smart devices connected within a system, and/or database associated with the system, to provide a consistent interface with such DDS, devices, and database, irrespective of the type of device connected to the system. Because of the consistent use of DDL's to access information pertaining to multiple devices, an application need not be reprogrammed to communicate with, read data from, reconfigure, or display data pertaining to a new device added to the system.

Preferably, this hierarchy includes a set of objects of different types which are defined within an object-oriented protocol, such as the now well-known Object Linking and Embedding (OLE) protocol. Each object includes properties and methods for operating on the data and is able to send messages to other objects within the hierarchy and to devices and hosts using the hierarchy to implement particular functions related to retrieving information from a smart device, database, or DD associated with the object. Preferably, the data within these objects represents subsets of the data available from and used by DDL's along with other information not provided by the DDL but useful to a host system or an application such as particular values, times that changes were made, identification of the users who implemented changes and the reasons for changes, etc.

A management system interface or communication network based on this hierarchy enables the management system to include all the functionality enabled by any smart device which has a DD. Thus, for example, a management system using this communication network allows the user the freedom to view multiple devices in a simultaneous or sequential manner, to perform common control and configuration functions without switching applications or interfaces, to run non-device-specific applications (such as browsers, which locate devices on the network, alarm lists, setup applications, and device status monitoring applications), and to run device-specific applications (such as device configuration, device calibration, and status-checking applications).

DETAILED DESCRIPTION

Figure 1:
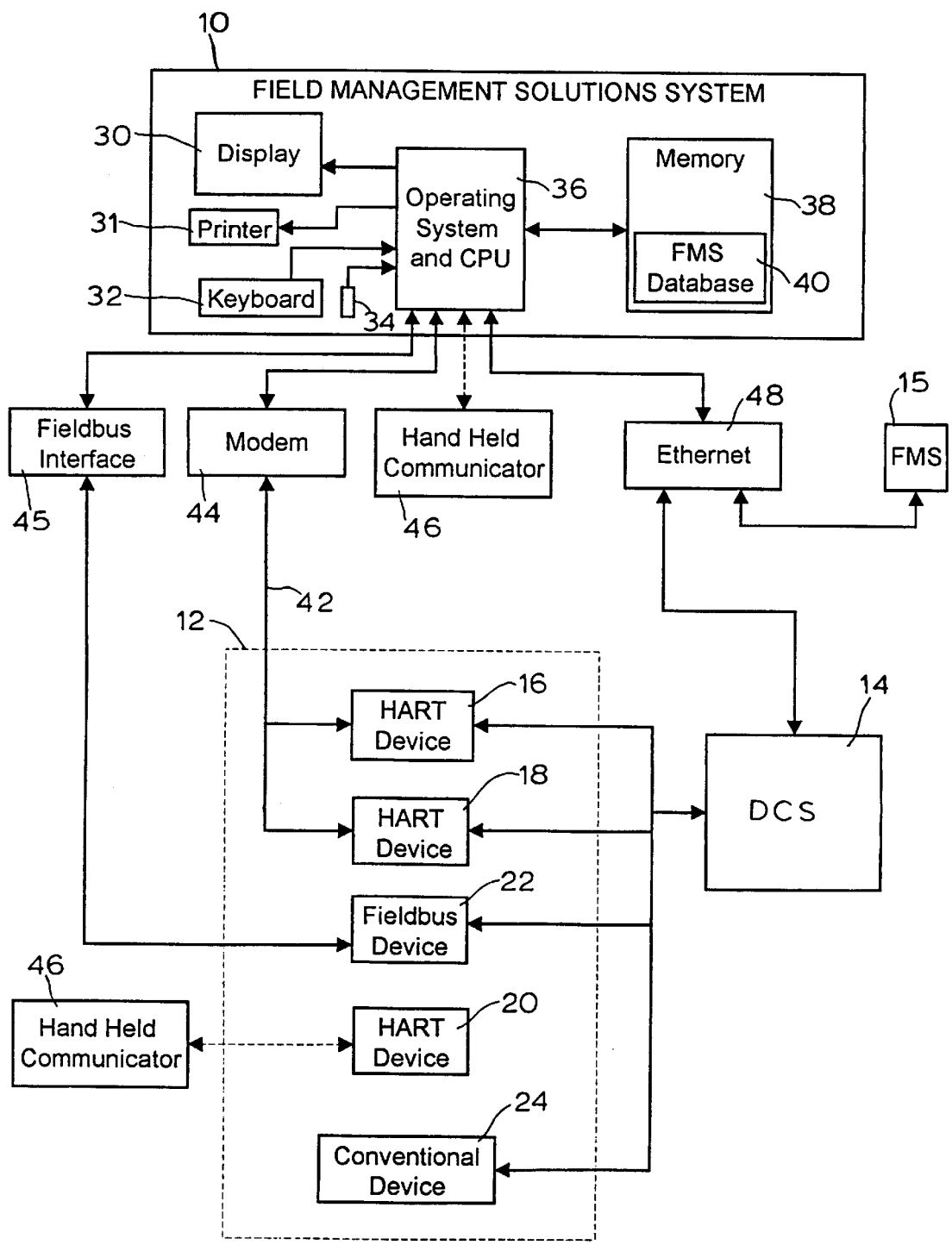
FIG. 1 is a block diagram illustrating the interconnections between a process, a digital control system and a management system.

FIG. 1 illustrates a management system 10, referred to hereinafter as a Field Management Solutions system (an FMS system), interconnected with a process 12, a distributed control system 14 (DCS) which controls the process 12, and a further management system such as another FMS system 15. The process 12 may comprise any desired type of process, such as a manufacturing process or a refinery process, etc., and is illustrated as including four smart field devices, including three HART devices 16, 18 and 20 and one Fieldbus device 22, and a conventional (i.e., non-smart) device 24. The devices 16, 18, 20, 22 and 24 are controlled in any desired manner by the DCS 14.

Generally, the FMS system 10 is a PC-based software tool that includes applications which perform field-device management tasks. The FMS system 10 integrates device management for each of the devices within the process 12 by helping users to, for example, configure, calibrate, monitor and troubleshoot any and all of the smart field devices associated with the process 12.

The FMS system 10, which may comprise any type of computer- or microprocessor-based system, may include a display 30, a printer 31., a keyboard 32 and a mouse 34 connected to an operating system and CPU 36. A memory 38 having an FMS database 40 is coupled to the operating system and CPU 36. The memory 38, including the FMS database 40, stores software and data used by the FMS system 10 in performing tasks related to displaying information to a user via the display 30 or the printer 31 and communicating with the smart devices 16, 18, 20 and 22. In addition, the FMS database 40 stores device-related information which is not available from the smart devices, for example, information pertaining to past configurations of the devices, information pertaining to off-line devices, such as off-line smart devices and conventional devices, and information pertaining to service notes including when the next service is needed; who performed service procedures; any favored replacement devices, etc. Data pertaining to off-line smart devices may be stored within the database 40 in a format identical to the format in which that data is actually stored within the off-line devices so that, to the FMS system 10, off-line devices appear to be available through the database 40 in the same way they would be available if those devices were on-line.

The smart devices 16 and 18 are on-line devices which are connected to the FMS system via a communication line 42 and a modem 44. The smart device 22 is an on-line device which is connected to the FMS system via a Fieldbus interface 45. The smart device 20 is an off-line device which is not permanently connected to the FMS system 10. However, the smart device 20 may communicate with the FMS system 10 via a hand-held communicator and/or secondary (laptop) FMS 46 which may be periodically connected to the device 20 and/or any of the other smart devices to read data from, and write data to, the device 20 and/or the other smart devices. Thereafter, the hand-held communicator and/or secondary FMS 46 may be connected to the FMS system 10 to upload data pertaining to the smart device 20 and/or any other smart devices to which it was attached and store such data in the FMS database 40.

If desired, the operating system and CPU 36 of the FMS system can be connected through, for example, an ethernet communication link 48 and/or other network link to the DCS 14 and other FMS systems, for example, the other FMS system 15.

Figure 2:
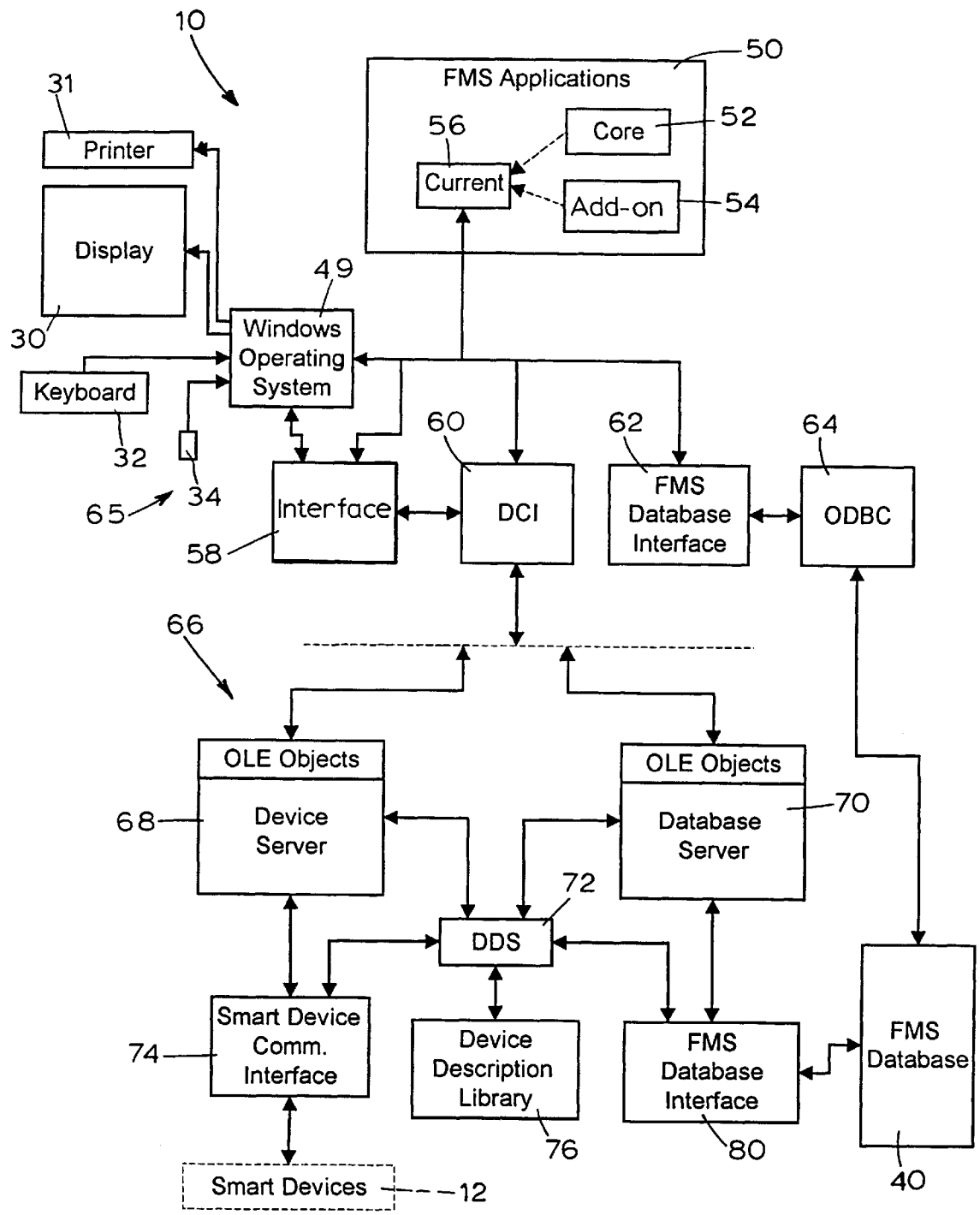
FIG. 2 is a block diagram of the management control system of FIG. 1 having a device communication interface which operates according to the present invention.

FIG. 2 illustrates the interconnections between various component parts of the FMS system 10, including hardware and software components, and will be used to describe how the various software components stored in the memory 38 of the FMS system 10 interact with each other, with the display 30, the printer 31, the keyboard 32, the mouse 34, the FMS database 40 and the smart devices within the process 12. It is understood that the software components of the FMS system 10 are stored in the memory 38 and are run on the operating system and CPU 36.

The FMS system 10 preferably operates in a Microsoft Windows environment (such as a Windows 95™ environment) and, therefore, includes a standard Windows operating system 49, which is used to display data and information on the display 30 and the printer 31 and to retrieve data and information from the keyboard 32 and the mouse 34. Thus, information provided to, or retrieved from, the Windows operating system 49 is preferably provided in a standard Windows call format of any desired type, as is known to those skilled in the art. However, the FMS system 10 could be implemented according to the present invention using any other desired Windows-based or non-Windows-based interface format (whether or not a graphical user interface) including, for example, MacIntosh, Xwindows or IBM DOS formats.

The FMS system 10 includes a set of FMS applications 50 comprising core applications 52 and add-on applications 54. The core applications 52 are essentially programs written by the FMS system provider to perform predetermined and frequently used operations. The add-on applications are applications which are developed by a user or a third-party developer and imported to the FMS system 10 to perform customized functions.

As used hereinafter, an application refers to any software routine implemented by the FMS system 10 which displays to a user information pertaining to or about the process 12 or one or more devices, blocks, parameters, or other information associated with the devices connected to, or associated with, the FMS system 10, and/or which allows a user to reconfigure one or more of the devices associated with or connected to the FMS system 10. The information used by an application typically is either stored in, or developed by, the smart devices within the process 12, or is stored in the FMS database 40.

Thus, for example, the FMS system 10 may include core or other applications which allow a user to interact with the data within the FMS database 40 and/or the smart devices within the process 12 to view the present state of one or more of the devices within the process 12, to change the configuration of one or more of the smart devices within the process 12, to view multiple devices in a simultaneous or sequential manner, to perform common smart device control and configuration functions, to run browsers that locate devices on the network, to monitor the status of devices and generate alarm lists, and to implement device calibration and testing routines.

Other typical core applications may include configuration applications, configuration-management applications, alarm scanning applications, history event-log applications, reporting applications, trend-analysis applications and diagnostic applications. A configuration application displays the values of the variables associated with one or more parameters of a device within a process and allows a user to change appropriate ones of those parameter values. A configuration management application allows a user to manage the configuration of the device as a whole, for example, resetting a device, initializing a device, and calibrating a device. An alarm scanning application checks all of the devices being serviced by the FMS system 10 to determine if those devices are operating correctly or if an error has occurred within any of the devices. A history event-log application provides an event log having, for example, user log-in information, time-stamped messages which indicate changes that have been made to the configurations of the devices being serviced by the FMS system 10, alarms associated with the devices being serviced the FMS system 10 and other events. A reporting application automatically generates a report showing, for example, all past, present or desired future configurations of one or more devices. A trend-analysis or "trending" application records data measured by devices within the process 12 to identify trends which may be occurring within particular devices or across a process as a whole. As is evident, any other desired applications can be created and provided to the FMS system 10.

During operation of the FMS system 10, a user selects one or more of the applications for execution. The selected application is identified in FIG. 2 as the current application 56. Because multiple applications may be executed simultaneously by the FMS system 10, there may be multiple current applications 56. Any current application 56 may interface directly with the Windows operating system 49, an interface block 58, a digital control interface (DCI) 60 and an FMS database interface 62. If desired, the current application 56 can also interface with an Open DataBase Connectivity (ODBC) block 64 (a well-known Microsoft database application interface (API) system that enables communication with nearly all databases) and a server network 65. For many applications, however, such connections are not necessary or desirable. Furthermore, any current application 56 may indirectly interface with the Windows operating system 49, the smart devices within the process 12, and the database 40 via the interface block 58.

The interface block 58 is essentially a software package having for example, specifically configured Windows custom controls, OCX controls or VBX controls, which automatically perform functions relating to the communication of particular, frequently used information between a current application 56, the smart devices within the process 12, the database 40, and a user interface 65 comprising the Windows operating system 49, the display 30, the printer 31, the keyboard 32, and the mouse 34. The interface block 58 can be used by a current application 56 to perform these interfacing functions without the application designer knowing the specifics of the protocols involved therewith. As a result, the interface block 58 enables an application to be designed more easily and provides a consistent user interface.

Preferably, current applications 56 and the interface block 58 interface and communicate with the smart devices within the process 12, other FMS systems or digital control systems and/or the database 40 through the DCI 60 and a server network 66 comprising servers 68 and 70. While typically the server network 66 will be located in, and associated with, the FMS system 10, the dotted line between the DCI 60 and the servers 68 and 70 in FIG. 2 indicates that the DCI 60 can also access server networks of other FMS systems through, for example, the ethernet connection illustrated in FIG. 1.

Essentially, the DCI 60 is a convenience layer which comprises a library of routines which perform functions necessary for communicating with, and retrieving data from, and other functions pertaining to the database 40, the smart devices associated with the process 12 and/or other FMS systems. In operation, the DCI 60 converts commands and messages sent from the current application 56 and the interface block 58 into a format recognized and used by server network 66 and, likewise, converts data provided by the server network 66 into a form recognized and used by the current application 56 and the interface block 58.

While the DCI 60 can use any desired protocol to perform these communication functions, the DCI 60 preferably uses an object-oriented protocol and, most preferably, uses an object linking and embedding protocol such as the Object Linking and Embedding (OLE) protocol developed and documented by MicroSoft, Inc. The MicroSoft OLE (2.0) protocol is used in the MicroSoft Windows 95™ operating system and is well-known in the art.

Generally, an object-oriented protocol is a programming paradigm which models the world as a collection of self-contained objects that interact by sending messages. Objects include data (a state) and methods (algorithms) that can be performed on the data. In addition, objects are related to one another through an interface connection and may communicate with other objects in the hierarchy through messages. When an object receives a message, it responds by using its own methods which are responsible for processing the data in that object and sending messages to other objects to perform specific tasks and possibly return appropriate results.

Because the DCI 60 communicates with the server network 66 through an OLE hierarchy, the DCI uses standard OLE procedures or calls relating to reading and writing values of OLE objects, enumerating a set of enumerated values in an OLE object, getting and setting properties in OLE objects, calling and implementing methods of OLE objects and retrieving property data stored in the OLE collection objects in conjunction with OLE Item methods (a particular type of OLE method). However, other OLE procedures can be implemented by the DCI 60 on OLE objects to communicate with the server network 66.

As described in more detail below, the particular OLE hierarchy which is preferably used by the FMS system 10 is an OLE object hierarchy which has been developed to categorize all of the different types of information and the interrelationships between the different types of information available for, or used by, each of the different DDL's associated with each of the DD's which, in turn, are associated with the devices within the process 12 being serviced by the FMS system 10. This determined hierarchy defines a set of OLE objects, each of which stores a particular set of properties as defined by the hierarchy and a particular set of methods which can be used to manipulate the property data and to communicate with other OLE objects according to the relationships defined by the hierarchy. This hierarchy will be discussed in more detail in conjunction with FIGS. 3 and 4.

Essentially, the DCI 60 communicates with the server network 66 as if all the OLE objects identified for the determined hierarchy exist within the memory of the server network 66. The DCI 60 implements a simple set of calls necessary for communicating with the OLE objects in the OLE protocol. In reality, however, the data and methods of each OLE object are not actually stored or placed in the memory of the server network 66 until a call, such as a read or write call, is sent to the server network 66 for such OLE object by, for example, the DCI 60, the DDS 72, the smart device communication network 74, or the FMS database interface 80. At that time, the server network 66 recognizes that the data and methods pertaining to the OLE object must be retrieved and stored in memory associated with one of the servers 68 or 70 and automatically performs the functions necessary to retrieve the data and methods of that OLE object.

When the server network 66 receives a call relating to the reading or writing of data or methods within one of the OLE objects stored in its memory, the server network 66 returns the requested information or performs the requested function to the OLE object data according to its stored routines so as to read data from, and write data to, the OLE object, the DDS 72, the smart devices within the process 12 and the FMS database 40.

Likewise, the DCI 60 recognizes or receives changes in OLE objects stored within the memory associated with the server network 66 and performs functions based thereon to implement communication with the current application 56 and the interface block 58. The device server 68 is essentially a set of software routines which have a specified correspondence with the set of OLE objects in the determined OLE hierarchy. These routines are specifically developed to communicate with a DDS 72, a smart device communication interface 74, and the OLE objects of the defined hierarchy. Such routines may, for example, transmit, retrieve, and change particular types of data and information stored within, or available from, the smart devices within the process 12 and/or from DD's (which are files) associated with the smart devices within the process 12. Likewise, the database server 70 is essentially a set of software routines associated with the OLE objects in the determined OLE hierarchy. These routines communicate with the DDS or API 72 and/or an FMS database interface 80 to, for example, transmit, retrieve, or change particular types of data and information stored within, or available from, the FMS database 40 and/or from the DD's which are associated with the smart devices for which data is stored in the FMS database 40. As indicated in FIG. 2, the DD's used by the DDS 72 are stored in a device description library 76 coupled to the DDS library 72.

The routines of the servers 68 and 70 are associated with each of the OLE objects in such a way that the routines which perform the particular read functions required for retrieving the data of an OLE object from the DDS 72, from smart devices, or from the database 40 are automatically implemented by a request for such data from the DCI 60. Likewise, the routines of the servers 68 and 70 are associated with each of the OLE objects in such a way that the routines which perform the particular writing functions required for changing the configuration of smart devices or storing information in the database 40 are automatically implemented by a request made by the DCI 60 to write such data in the OLE object.

For example, a request made by the DCI 60 to write the value property within an OLE object representing data within or associated with a smart device, will cause the server 68 to implement the routine which writes new property values to the smart device. Likewise, a request to read from any OLE object property values stored in, or associated with, a smart device will automatically call the server routine which retrieves the property values associated with that OLE object from the DDS and/or the smart device and store such property values in the memory (not shown) associated with the server 68 as the OLE object. Similarly, a request made by, for example, the DCI 60, to write the property values within an OLE object associated with data stored in the database 40 will automatically implement the server 70 routine which writes new property values to the locations within the database 40 with which that OLE object is associated. Likewise, a request to read property values from an OLE object will cause the server 70 to retrieve the data associated with that OLE object from the DDS and/or the location in the database 40 associated with those property values and store such property values in the memory (not shown) of the server 70 as the OLE object.

These server routines are simple, straightforward, and easy to write by those skilled in the art and are not, therefore, provided herein. However, those familiar with OLE and DDL's can create such routines in a straightforward manner using any desired programming language. If desired, the routines may be written or optimized in any desired way to perform in as high-speed a manner as possible to thereby increase the operating speed of the current application within the FMS system 10.

Generally, to retrieve specific data from, or pertaining to, one of the on-line devices of the process 12, the server 68 asks the DDS 72 for the specific data. If that data is stored in the DD for a smart device, the DDS 72 then consults the DD for the referenced device or the DD associated with a block of the referenced device and returns the requested data to the server 68.

If the specific data was available from the DD, the server 68 stores and maintains that data in the OLE object to which the retrieved data is related. If however, the requested specific data is not available from the DD for a device or a block of a device but is stored, instead, in the on-line device, the server 68 sends a command to the smart device communication interface 74 (which may comprise any known smart device communication interface including, for example, a Fieldbus device interface developed by SoftIng, a German company located in Karlsruhe, or the HART device interface of Micromotion, located in Boulder, Colo.) to retrieve the specific data from the on-line device.

The smart device communication interface 74 then sends a request to the DDS 72 for information on how to retrieve the specific data requested by the server 68 from the on-line device. The DDS 72 retrieves this instruction information from the DD for the on-line device and returns the instruction information to the smart device communication interface 74 which, in turn, sends a proper request to the on-line smart device. The smart device then responds with a data stream including the specific data. The smart device communication interface 74 then sends a request to the DDS 72 for information on how to interpret the data stream received from the on-line smart device. The DDS 72 then retrieves interpretation instructions from the DD for the on-line smart device and returns them to the smart device communication interface 74 which, in turn, interprets the data stream from the on-line device in accordance with the interpretation instructions in order to extract the specific data requested by the server 68. The smart device communication interface then returns the specific data to the server 68 which provides the retrieved data to the OLE object with which that data is associated.

The process of writing data to an on-line device is similar to the process of reading data from that device except that the server 68 first sends a request to the DDS 72 for write information, e.g., whether the data is writable, what type, specific values and range of data can be written, etc. If the data is writable, the server 68 sends a write command to the smart device communication interface 74 which, in turn, interfaces with the DDS 72 for write protocols for the on-line device and sends the proper write command to the on-line device in response to the information. The smart device communication interface 74 can also interpret other data from the on-line devices, such as write verifications, response codes, data or value changes which occur in the device, etc. and sends such data to the server 68 for storage in the proper OLE object.

In some instances, the DDS 72 will inform the server 68 that it needs more information to answer a request for data. For example, the DDS 72 may determine that the handling property of a parameter (i.e., whether the parameter is readable and/or writable) is dependent on the mode parameter of a particular device. The DDS 72 sends a request to the server 68 for the mode parameter of the device. In response thereto, the server 68 sends a request for the mode parameter of a device to the smart device communication interface 74 which operates as described above to retrieve the mode parameter of the device. When the server 68 receives the mode parameter of the device from the smart device communication interface 74, it sends this information to the DDS 72 which, thereafter, determines the handling property of a parameter of a device and returns such property to the server 68 which, in turn, places that value in the proper OLE parameter object.

Communication between the server 70, the DDS 72 and the FMS database interface 80 is similar to that described above, except that the FMS database interface 80 is programmed to read and write information to and from the FMS database 40 instead of a smart device. Generally, however, the FMS database interface 80 mimics the functions of the smart device communication interface 74 as they relate to communications between the DDS 72 and the server 70.

It is possible to have the FMS database interface 80 store information pertaining to, for example, values associated with off-line devices and data pertaining to changes made to on-line and off-line devices in the database 40 in a DDL format, i.e., in a format that mimics how such data is stored in on-line devices. In such a situation, the FMS database interface 80 may need to access the DDS 72 to determine how the data is stored in the FMS database 40. For example, in some instances, the database 40 stores parameter values, such as past parameter values in order to, for example, mimic the state of a device. Consequently, the FMS database interface 80 may have to access the DDS 72 to retrieve this information to know what type of data is stored in the database, i.e., integer, enumerated, etc. However, information stored in the database 40 need not be stored in a DDL format. Therefore, to service a command from the server 70 to read data from, or write data to, the database 40, the FMS database interface 80 may not need to access the DDS 72 for device values. Instead, the FMS database interface 80 may write data to, and read data from, the database 40 directly.

The FMS database interface 80 is preferably an application program interface (API) of any conventional type which is specifically set up and configured for retrieving information from the database 40 according to any desired or known method. Thus, the FMS database interface 80 automatically keeps track of where and how data is stored in, and retrieved from the database 40.

As indicated above, the current application 56 and, if desired, the interface block 58 can also interface with the database 40 through the FMS database interface 62 and the ODBC block 64. The FMS database interface 62 may comprise any desired or known applications program interface (API) having a library of routines developed to convert data and requests from a format recognizable or used by the current application 56 into a form recognizable and usable by the ODBC block 64 and vice-versa. Using the FMS database interface 62 (API) to write to the database 40, as opposed to using the ODBC block 64 directly, helps maintain database integrity and consistency and makes applications easier to write because the application is then shielded from database management. Typically, the FMS database interface 62 and the ODBC block 64 (or any other open database accessing system) will be used when an application needs to store data in the database 40 in a format that is inaccessible or incompatible with the OLE object hierarchy communication scheme discussed herein.

Figure 3:
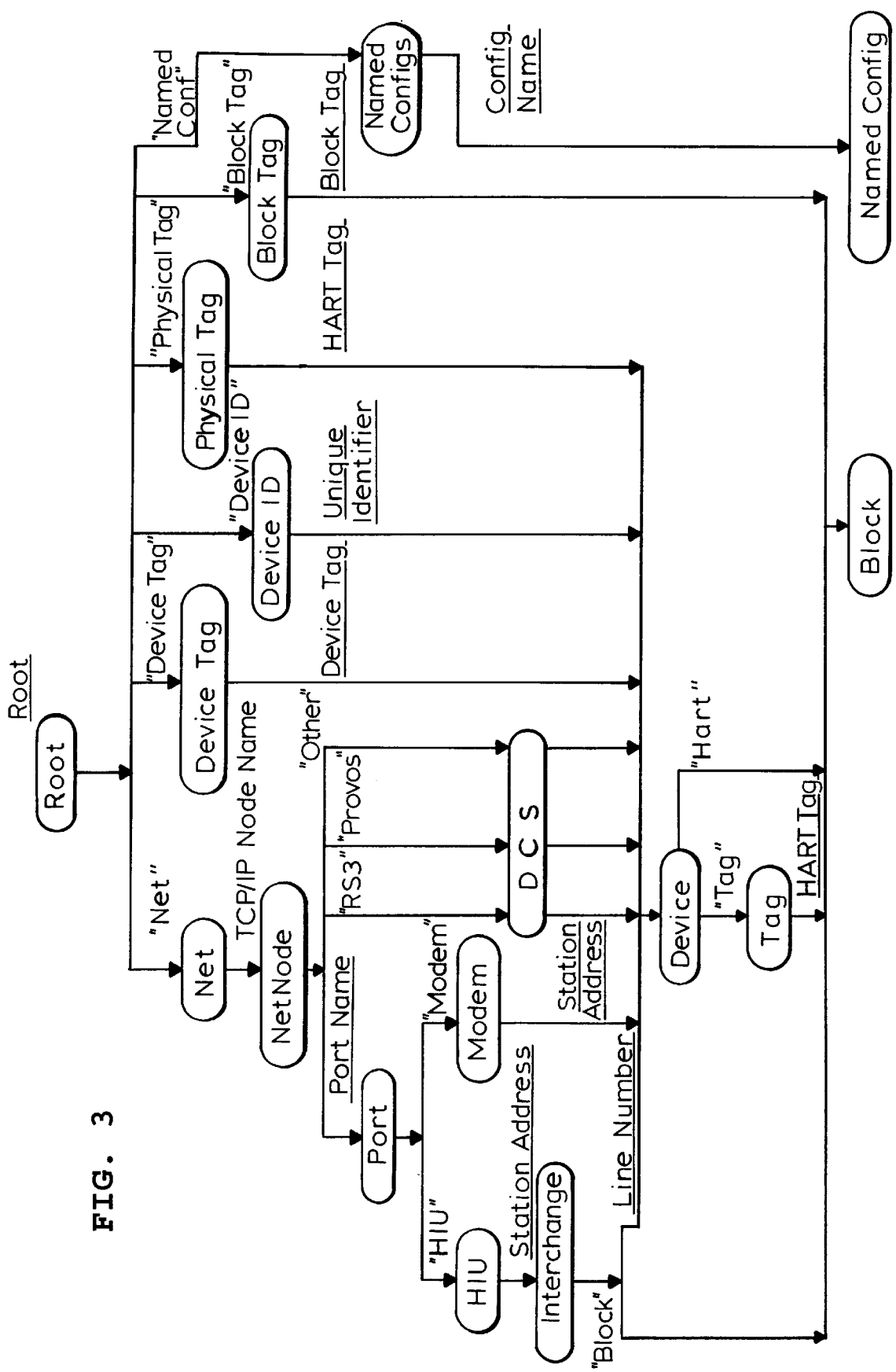
FIG. 3 is an upper hierarchy of object information according to the present invention.
Figure 4A:
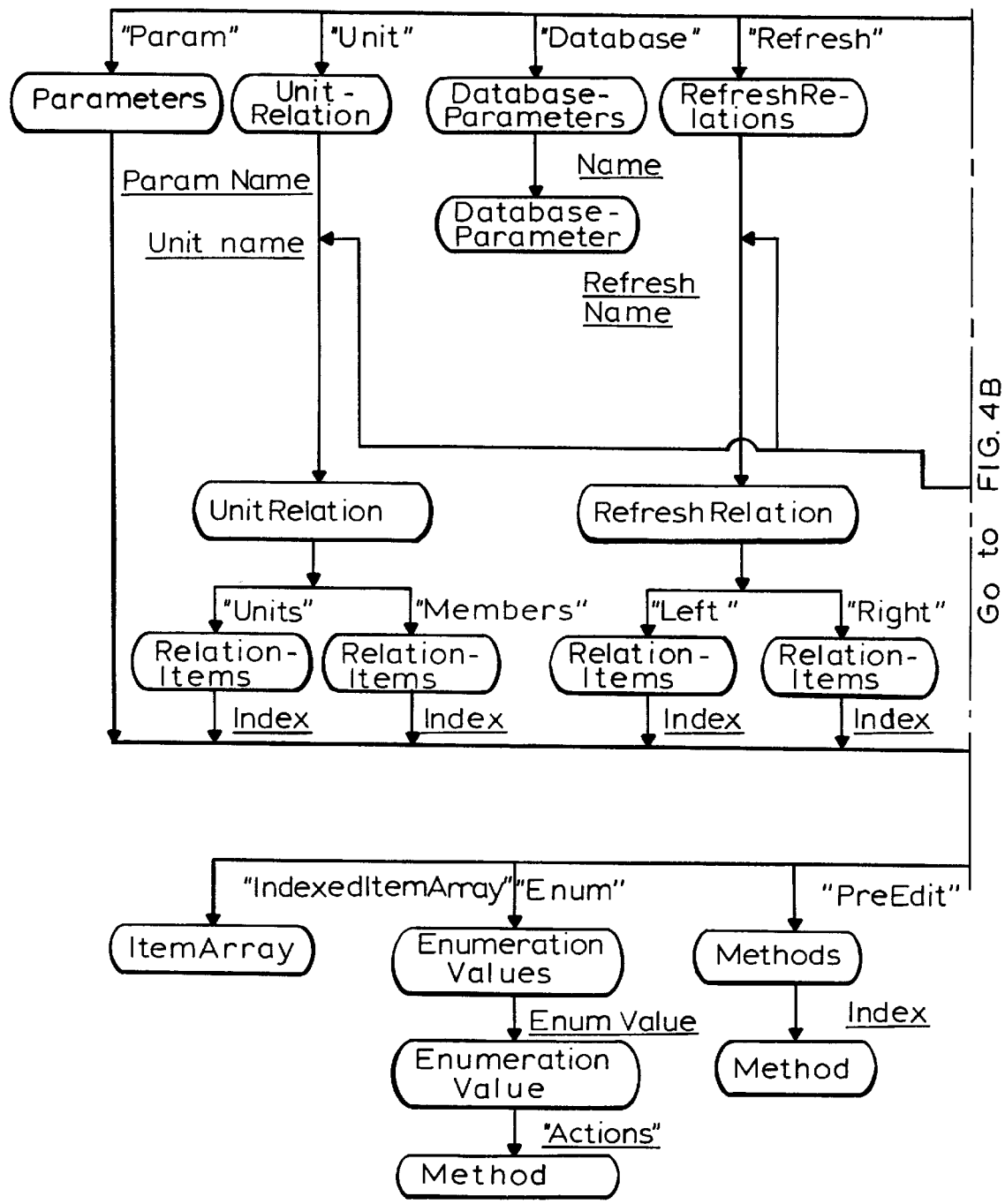
FIGS. 4A–4C are a lower hierarchy of object information according to the present invention.
Figure 4B:
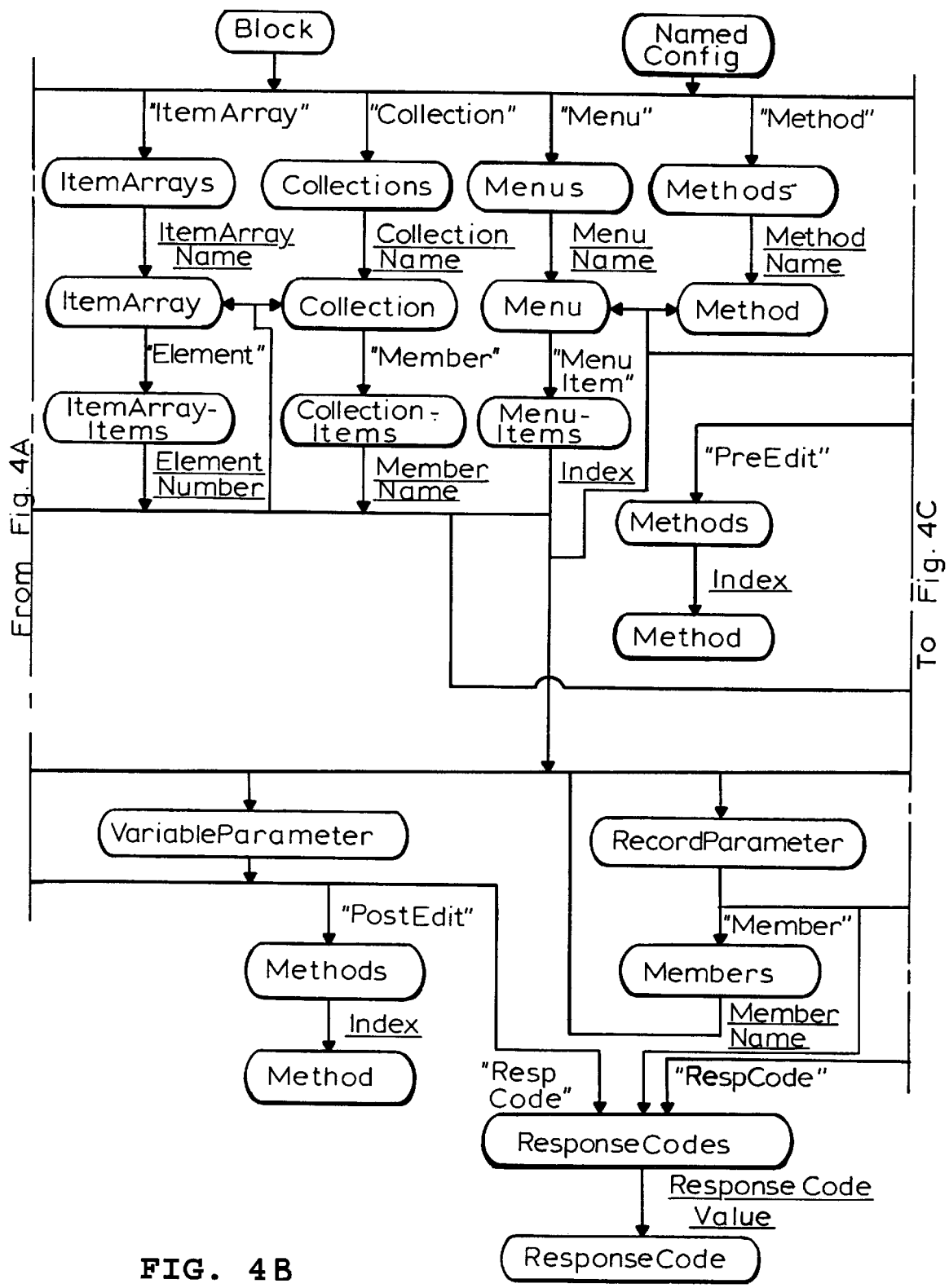
Figure 4C:
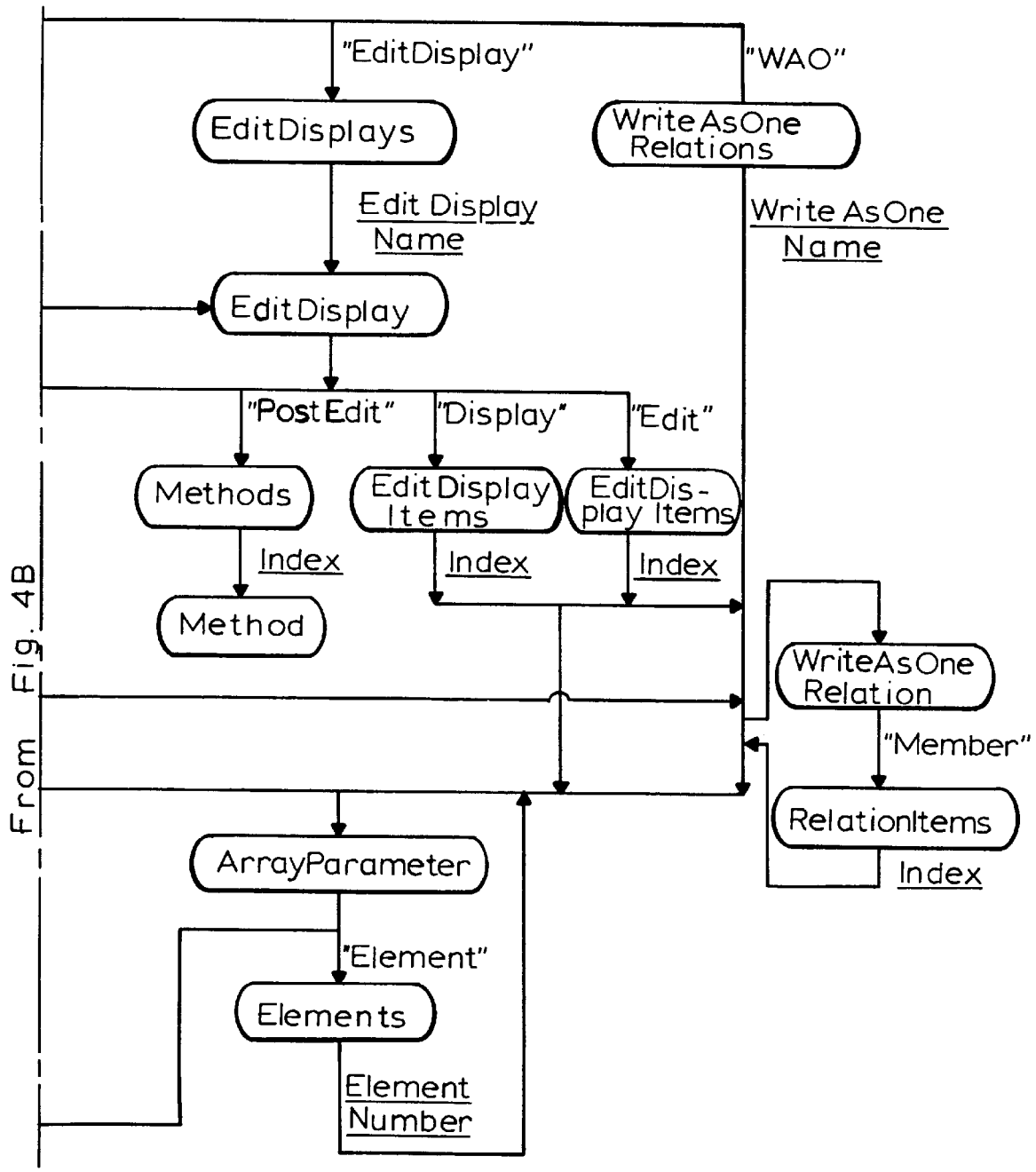

FIGS. 3 and 4 illustrate a particular hierarchy of OLE objects which has been developed to represent all of the information defined within or available from one or more DDL's, a set of smart devices which follow the protocols of those DDL's and a database which stores information related to devices using those DDL's. The hierarchy of FIGS. 3 and 4 also represents the relationships between those OLE objects. This hierarchy can be used within an OLE environment to enable an application to retrieve information associated with a DDL, smart devices which use that DDL, and a database which stores information pertaining to smart devices which use that DDL. Thus, the hierarchy of FIGS. 3 and 4 represents not only an arrangement of DDL information (i.e., information available from DD's of DDL's and/or information available from a device or a database associated with devices using one or more DDL's), but also a way of defining an interface between the DCI 60 and the servers 68 and 70 of FIG. 2 in order to access, retrieve, and change this information.

Each of the OLE objects in the hierarchy of FIGS. 3 and 4 is preferably an OLE automation object and is represented as an oval having the type of OLE object identified therein. Each of the OLE objects of FIGS. 3 and 4 includes, or is associated with, a subset of the information defined within or used by one or more DDL's and available from DD's, smart devices and databases which store information pertaining to smart devices.

Generally, each of the OLE automation objects of FIGS. 3 and 4 includes properties (or attributes), methods and interfaces. Because the OLE objects within FIGS. 3 and 4 are automation objects, they have an IDispatch interface (a well-known interface of the OLE protocol) associated therewith. The IDispatch of the OLE automation objects of FIGS. 3 and 4 can be used by, for example, the DCI 60 and the server network 66 to retrieve information pertaining to the properties and the methods of that OLE object and to communicate with other OLE objects.

The properties of an OLE object comprise data pertaining to the objects. Each property also has functions which can be used, for example, to get the property value and to set the property value of the OLE object. Example OLE object properties include the name of the object, a count of the number of items within or associated with the object, a label associated with the object, and help associated with the object.

OLE object methods perform actions on OLE objects, or on the data in OLE objects, implement particular routines using the data in OLE objects, and communicate with other OLE objects. For example, a method may enumerate a set of values in other OLE objects. Together, the properties and the methods of an OLE automation object define the programmable interface of that OLE object accessible by the server network 66 and the DCI 60.

The hierarchy of FIGS. 3 and 4 comprises an upper hierarchy, illustrated in FIG. 3, and a lower hierarchy, illustrated in FIG. 4. The upper hierarchy of FIG. 3 corresponds to and illustrates the physical or defined connectivity of devices such as HART, Fieldbus, and other smart or conventional devices, and blocks, such as Fieldbus blocks, connected within a process. The lower hierarchy of FIG. 4 illustrates relationships among the data which is available from, or referenced by, DDL's such as the HART and Fieldbus DDL's, and the data which is stored in and/or available from DD's, smart devices and/or a database pertaining to smart or other devices.

In order to facilitate a complete understanding of the hierarchy of FIGS. 3 and 4, a table (entitled "OLE Object DDL Equivalents") is provided at the end of the present specification. The OLE Object DDL Equivalents table identifies, for each of the OLE objects illustrated in the lower hierarchy of FIG. 4, the functionally equivalent data, definitions and/or constructs of the Fieldbus DDL that correspond to the OLE object. It should be recognized, however, that the OLE objects of FIGS. 3 and 4 similarly have functionally equivalent types of data, definitions, and constructs available in other DDL's, such as the HART DDL, and that the hierarchy of FIGS. 3 and 4 therefore can be applied to any DDL. Another table (entitled "OLE Object Definitions"), also appearing at the end of the present specification, provides a list of some important properties and methods associated with each of the OLE objects illustrated in FIGS. 3 and 4, and provides a short description of those properties and methods.

Once again, the properties of the OLE objects of FIGS. 3 and 4 represent, and correspond to, similar types of data available from, or defined by, DDL's (for example, the HART and Fieldbus DDL's) because, as noted above, the OLE objects of FIGS. 3 and 4 have been developed to map onto and represent the data available from or defined by these DDL's. Thus, for example, the Block object of FIG. 3 represents and corresponds to the block entity recognized and used by the Fieldbus DDL, while the Device object of FIG. 3 and the Parameter object of FIG. 4A represent and correspond to the device and parameter entities, respectively, recognized and used by both the HART and Fieldbus DDL's. The methods identified in the OLE Object Definitions table are standard OLE methods.

Each OLE object within the hierarchy of FIGS. 3 and 4 can be accessed or defined by traversing a path through the hierarchy to that OLE object. Beginning at the top of FIG. 3, every path through the hierarchy of FIGS. 3 and 4 includes a Root object. Root objects define, among other things, the ViewTime to which the data within any of the OLE objects below the Root object pertains. More specifically, the Root object is associated with a ViewTime, which may be "past," "present," or "future" and, in some instances, which specifies a particular time. If the ViewTime is present, the time is the actual time. If the ViewTime is past, the time may be set to any historical time but, preferably, is set to a time at which a change was made to one or more parameter values. Preferably these changes are stored in the database 40 in, for example, an event log. If the ViewTime is future, the time may be set to any future time or may be set to indicate only that it refers generally to the future.

The Item method of the Root object includes a set of collections, as identified in the OLE Object Definitions table, which defines the next layer in the hierarchy of FIG. 3. Generally, the collections of the Item method of an OLE object define interconnections between that OLE object and the OLE objects below that OLE object within the hierarchy of FIGS. 3 and 4. Each collection of an Item method of an OLE object is illustrated in the hierarchy of FIGS. 3 and 4 by the quoted name of that collection below the OLE object which includes that collection. The generic name of the members within a collection are identified in the hierarchy of FIGS. 3 and 4 by unquoted and underlined expressions located beneath the OLE object associated with the collection type and above the OLE object which has information pertaining to this expression as one of the properties thereof.

Thus, for example, the Root object has a collection of BlockTag objects (identified as the "BlockTag" collection), each of which has a particular name illustrated generally in FIG. 3 as Block Tag. Generally, a block tag is a unique identifier assigned to a particular block within the FMS system by a technician installing/configuring the FMS system in order to identify a particular block. A BlockTag object having a name of Block Tag, therefore, uniquely defines a Block object, as illustrated in FIG. 3. As is evident, the actual number of BlockTag objects within the hierarchy of FIGS. 3 and 4 is dependent on the number of blocks (as that name is used in the Fieldbus DDL protocol) connected to or associated with the FMS system 10.

The PhysicalTag, DeviceID, and DeviceTag objects relate to or are associated with the "PhysicalTag," "DeviceID," and "DeviceTag" collections of the Root object, respectively, and are used to uniquely define a particular device connected to or associated with the FMS system 10. A device ID typically includes a triplet of information comprising the name of the device manufacturer, the model number of the device, and the serial number of the device. Device tags and physical tags usually refer to a location of the device in a plant or a process such as the process 12. The value of a physical tag and/or a device tag can be, for example, an alphanumeric code associated with a specific physical location in the plant or any other description of a physical location. For HART devices, the physical tag is considered the same as the device tag whereas, for Fieldbus devices, the physical tag can have a different value than the device tag. The OLE objects in FIGS. 3 and 4 immediately below a quoted collection name, such as the PhysicalTag object, the DeviceTag object, and the DeviceID object, are also referred to as collections because they are related to constructs which a DDL considers or defines as collections.

In lieu of, or in addition to having a device tag, a physical tag and/or a device ID, a device can be identified by its physical communication connection to an FMS system. Specifically, each device is connected to an FMS network (illustrated in FIG. 3 by the Network object which is a "Net" collection of the Root object) through one of a number of networks, each of which is identified generically by the expression TCP/IP Node Name.

Each network includes a series of nodes, identified in FIG. 3 by the NetNode object. A network node includes a set of ports (illustrated by the Port object) which may have names of, for example, "Com1" or "Com2". The port may connect to a device through a modem (identified by the Modem object) and at one of sixteen station addresses, each of which is identified by a different Station Address.

The port of a network node may also connect to a device through one or more HART interface units (HIU's) (identified by an HIU object) having a Station Address. Each HIU includes one or more interchanges (identified by the Interchange object) each of which typically includes 8 lines identified by Line Number. Interchange objects also include a method (which, contrary to the above-stated general rule about quoted names, is identified by the label "Block") which returns an interface to the particular Block object that describes the HIU.

A network node can also be coupled to a device through one or more different DCS's, for example, the RS3, Provox, or other DCS's. Although FIG. 3 illustrates each of these as connected through a generic DCS object, the actual connection to an RS3 DCS, for example, would be made and could be identified in FIG. 3 by a node number, a card number, a port (typically one of four ports in a card) and a line (typically four lines per port). However, because the configurations of these DCS systems are not yet fully developed, the actual connections with each are not shown and the DCS object is not mentioned in the OLE Object Definitions table.

Furthermore, a network node may be coupled to one or more Fieldbus interface cards. However, because the Fieldbus devices are not yet being sold, the exact connection to a device is not yet known and, therefore, this connection is not represented in the hierarchy of FIG. 3. However, such a Fieldbus connection could easily be added by showing a Fieldbus object and any other OLE objects related to the components required for a Fieldbus connection from between a network node and a device between the NetNode object and the Device object.

Once a device is identified in any manner specified above, a block within the device can be uniquely determined by the "Tag" collection, illustrated as the Tag object, having the HART Tag name. If the device is a HART device, the contents of which are represented by only one conceptual block, the block is already uniquely identified and can simply be specified by the "HART" collection. The names of the tags related to the Tag object are specified as HART Tag in FIG. 3 because the HART tag of HART devices is used as this identifier. However, other tags for other types of devices could be used instead.

As suggested above, a Block object and, correspondingly, a block of a process, can be uniquely identified by traversing any of the above defined paths through the upper hierarchy of FIG. 3. Likewise, every other OLE object within the hierarchy of FIGS. 3 and 4 can be identified by a unique moniker derived by traversing a path from the Root object at the top of the hierarchy of FIG. 3 through to the particular OLE object. Thereafter, the properties and methods of any of the OLE objects within the hierarchy of FIGS. 3 and 4 can be referenced and obtained using the moniker developed for that OLE object.

More particularly, a moniker can be determined from the hierarchy of FIGS. 3 and 4 by compiling a string comprising the quoted and the unquoted/underlined expressions encountered in traversing a path from the Root object in FIG. 3 to the OLE object of interest, and separating these expressions with an exclamation point ("!"). For example, the moniker for a Block object can be any of the following:

Root!BlockTag!Block Tag!

Root!PhysicalTag!HART Tag!Tag!HART Tag

Root!DeviceID!Unique Identifier!HART

Root!Net!TCP/IP Node Name!Port

Name!Modem!Station Address!Tag!HART Tag

As will be evident, monikers for other OLE objects illustrated in FIGS. 3 and 4 can be developed using this format. The "NamedConfig" collection of the Root object of FIG. 3 (represented by the NamedConfigs object) relates to objects which are stored in the FMS database 40 and which are not available from a device. Each NamedConfigs object is identified by a ConfigName to specify a particular NamedConfig object. A NamedConfig object may include, for example, a "recipe" or particular configuration of a block necessary for implementing a particular function within a process, a past configuration of a block within a process, or for that matter, any other desired user information related to Block objects. However, to the server network 66 of FIG. 2, each NamedConfig object looks similar to a Block object except that the parameter value data of a NamedConfig object is retrieved from the FMS database 40 as opposed to being retrieved from a device. NamedConfig objects may have a subset of the information typically associated with a Block object.

The lower hierarchy of FIG. 4 illustrates an interrelationship among the data associated with each block of a system. Therefore, as illustrated in FIG. 4, each Block object (and each NamedConfig object) includes a set of collections denominated "Param," "Unit," "Database," "Refresh," "ItemArray," "Collection," "Menu," "Method," "EditDisplay," and "WAO," each having an associated (although slightly differently named) OLE object. Each of these OLE objects, in turn, have other OLE objects related thereto as defined in FIG. 4. Thus, for example, a Parameter object identified by a Param Name may be a VariableParameter object, a RecordParameter object or an ArrayParameter object. If it is a VariableParameter object, it includes collections of "IndexedItemArray," "Enum," "PreEdit," and "PostEdit," all having associated OLE objects. The EnumerationValues object (a collection of the VariableParameter object for variables of the enumerated type) has particular enumerated values identified by the Enumeration Value object which, in turn, includes a collection of Method objects. These Method objects may, for example, include methods of getting or changing enumerated values of a VariableParameter object.

The property, data, and methods stored in, or associated with, all of the OLE objects within FIG. 4, except for the DatabaseParameters and DatabaseParameter objects, represent information which is available from or through the use of DD's or a device conforming to a DDL. The data and method of the DatabaseParameters objects and DatabaseParameter objects are stored in a database.

As with FIG. 3, any OLE object in FIG. 4 can be uniquely identified by a moniker developed by tracing a path from the Root object of FIG. 3 down to the particular OLE object of interest. Thus, for example, the moniker for a pre-edit Method block could be constructed by adding onto the end of the moniker for any Block object of FIG. 3, which is also represented by the Block object of FIG. 4, the expression !param!Param Name!PreEdit!Index.

Once a moniker is established for a particular object within the hierarchy of FIGS. 3 and 4 and stored in the memory associated with the server network 66, the DCI 60 and the server network 66 can, thereafter, operate on and access that OLE object using a shorter unique "handle" generated by the server network 66. The handle may, for example, comprise a unique number identifying an OLE object which has been stored in the memory of the server network 66.

In essence, with a unique moniker or the handle, any OLE object identified by the hierarchy of FIGS. 3 and 4 can be immediately accessed by the DCI 60 or the server network 66 and the methods within that OLE object can be invoked in order to accomplish communication with the DDS, a database, a smart device, or other OLE objects as necessary. Thus, for example, the software routine within the server 68 which accesses the DDS 72 to retrieve a particular parameter value from a particular device can be initiated when a call to the proper VariableParameter object is initiated by the DCI 60 using a command which tells the OLE VariableParameter object to read a parameter value.

As is evident, the server network 66 communicates with the database 40, the DDS 72, and the on-line devices transparently to the DCI 60 and the current application 56, because the server network automatically accesses the inter-relationships between the OLE objects identified by the lower hierarchy of FIG. 4 to determine which set of routines to implement in order to obtain new information requested by an OLE object or a DDS.

It should be noted that, for any OLE object of FIGS. 3 and 4 to be accessed, the OLE objects above that OLE object in at least one path between that OLE object and the Root Object FIG. 3 must be stored in the server network memory. Thus, for example, when accessing a VariableParameter object of a parameter for a block, the Parameter object and the Block object associated with that parameter and that block will also be stored in the server network memory. The Device object, the DeviceID object and the Root object may also be stored in the server network memory. Without these higher level objects, the server network 66 can not access enough information to determine how to locate and retrieve the data of the VariableParameter object.

In a typical situation, the DCI 60 sends a command to get a value from an OLE object, for example, the Handling property of a VariableParameter object for a particular block of a particular device using a moniker or a handle which has been provided for that VariableParameter object. If the identified OLE object has not yet been stored in the memory of the server network 66, the server network 66 uses pre-written routines and the methods of the one or more OLE objects above that VariableParameter object to retrieve this data from, for example, one of the DDS 72, the smart device itself, or the database 40. The server network 66 then stores this data in a server memory. If needed the server network 66 first stores for example, the Root object, the DeviceID object, the Device object, the Block object, and the Parameters object, in memory.

Next, the server uses the methods of the VariableParmeter object and pre-written routines associated therewith to access the DDS 72 (because that is where the Handling information of a variable parameter of a block is located). If, as in this instance, the value of the Handling property of the variable parameter depends on the mode parameter to which the smart device is currently set, the DDS returns a message to the server 68 telling the server 68 that the DDS needs the mode parameter information pertaining to the device or block which contains that variable. At this point, the server 68 locates the Device object related to the VaribleParameter object to determine how to communicate with the device, i.e., where the device is located in the system and how to interact with that device. The server 66 then uses a prewritten routine for communicating with the device associated with the Device object to instruct the smart device communication interface 74 to retrieve the mode parameter of the device. When the smart device communication interface 74 returns the mode parameter value to the server 68, the server 68 provides this information to the DDS 72 which, thereafter, computes and returns the Handling property to the server 66 which then forwards this information to the OLE VariableParameter object and, thereby to the DCI 60 (because changes in OLE objects result in messages being sent to the host, i.e., the DCI 60 in this case). Thus, to the DCI 60, it merely appears that a request for a read of the Handling property of a parameter was sent to an OLE object and that a message was returned with the Handling property. The communication with the DDS and between OLE objects was accomplished automatically by the server transparently to the current application 56, and the application did not need to know any specifics regarding the type of device was accessed, the DD or DDL associated with that device, etc. Thus, using the interface defined above, an application can communicate with a number of different smart devices following the same or different DDL protocols without the need to consider any of the specifics of the DDS, DDL or DD which must be used to implement that communication.

As will be apparent to those skilled in the art, the DCI 60 may thereby operate to communicate with and retrieve information from the OLE hierarchy represented by FIGS. 3 and 4 by performing relatively simple routines which, for example, (1) create an object hierarchy and associate it with the server network 66, (2) traverse the object hierarchy to explore the objects below a specified object, (3) implement standard OLE methods like Item, which traverses a specific path from one object to another, and NewEnum, which creates an interface to enumerate objects one level below, (4) implement methods related to Block objects which may include methods related to DDL operations, (5) read and write Root and Device object properties, (6) initiate and control non-blocking read and write requests from OLE objects, (7) retrieve results from blocking reads and writes, (8) control changes to the database 40, and (9) control the creation and maintenance of an event log that includes information pertaining to, for example, user changes to the system including change times, identification of the persons and the computers which made the changes, etc.

As a result, an application for the FMS system 10 does not have to be specifically programmed to interface with a DDS, database or smart devices which, in turn, allows an application developer to be much less knowledgeable with respect to DDL formats, DD's and smart device communications.

It will be noted that, using the hierarchy of FIGS. 3 and 4 as described above, any application implemented by the FMS system 10 can interface with FMS devices using, for example, any OLE-compatible programming environment to gain access to the IUnknown and IDispatch interfaces associated with each object in the hierarchy. It is considered that Visual Basic programs and C++ programs are well-suited to use the above-defined OLE hierarchy.

Furthermore, although the hierarchy of FIGS. 3 and 4 is specifically related to the Fieldbus DDL and to the HART DDL, which is very similar to the Fieldbus DDL, it is considered that this or a similar hierarchy can be made for other DDL's associated with other smart devices including, for example, Modbus smart devices in accordance with the present invention. Furthermore, it is considered that the hierarchy of FIGS. 3 and 4 can be implemented by other object-oriented programming protocols and even by non-object oriented programming protocols.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

OLE OBJECT DDL EQUIVALENTS

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
| --- | --- |
| ArrayParameter object | The DDL equivalent is an array, which is a logical group of values. Each value, or element, is of the data type of a DDL variable. An element may be referenced from elsewhere in the device description via the array name and the element index. DDL arrays describe communication array objects. Therefore, from a communication perspective, the individual elements of the array are not treated as individual variables, but simply as individual values. |
| Block object | The DDL equivalent is a block, which defines the external characteristics of a DDL block. |
| Collection object This OLE object represents a particular object in the Collections collection object. (see Collections) | The DDL equivalent is a collection, which is a logical group of members. Each member in the group is assigned a name. The members may be referenced in the device description by using a collection name and a member name. |
| CollectionItems collection object ("Member") | The DDL equivalent is a collection, which is a logical group of members. Each member in the group is assigned a name. The members may be referenced in the device description by using a collection name and a member name. |
| Collections collection object ("Collection") | The closest DDL equivalent is a collection, which is a logical group of items (in this case collections). Each collection in the group is assigned a name. The collections may be reference from in the device description by using the collection name and the name of the collection of collections. |
| DatabaseParameters collection object ("Database") | There is no DDL equivalent to this OLE collection object, which exists only in the FMS database. This object relates to a collection of parameters stored in a database. |
| DatabaseParameter object | There is no DDL equivalent to this OLE object, which exists only in the FMS database. This object relates to a parameter stored in a database. |
| EditDisplay object | The DDL equivalent is an edit display, which defines how data will be presented to a user by a host. It is used to group items together during editing. |
| EditDisplayItems collection object ("Display" and "Edit") | The DDL equivalent is a collection of edit items, which are a set of block parameters and elements of block parameters to be edited by the user. The display items are provided to allow the user to decide what the values of the edit items should be. |
| EditDisplays collection object ("EditDisplay") | The DDL equivalent is a collection of edit displays, which define how data will be |

-continued

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
| --- | --- |
| Elements collection object ("Element") | presented to a user by a host. They are used to group items together during editing. The DDL equivalent is a collection or group of elements, which specify one item (such as a variable or menu) in the group, and is defined by a group of four parameters (index, item, description and help). |
| EnumerationValue object | The DDL equivalent is a variable of the enumeration type. Such variables include enumerated variables, which are unsigned integers that have a text string associated with some or all values (useful for defining tables, for example), and bit-enumerated variables, which are unsigned integers that have a text string associated with some or all bits (useful in defining status octets). |
| EnumerationValues collection Object ("Enum") | The DDL equivalent is a collection of variables of the enumeration type. |
| ItemArray collection object ("IndexedItemArray") | The DDL equivalent is a collection of item arrays. |
| ItemArray object | The DDL equivalent is an item array, which is a logical group of items, such as variables or menus. Each item in the group is assigned a number, called an index. The items can be referenced from elsewhere in the device description via the item array name and the item number. Item arrays are merely groups of DDL items and are unrelated to communication arrays (item type "ARRAY"). Communication arrays are arrays of values. |
| ItemArrayItems collection object ("Element") | The DDL equivalent is an element, an attribute of an item array which identifies elements of the item array. Each item array element specifies one item (such as a variable or menu) in the group, and is defined by a group of four parameters (index, item, description and help). |
| ItemArrays collection object ("ItemArray") | The DDL equivalent is a collection of item arrays. |
| Members collection object ("Member") | The DDL equivalent is a collection of members, which are variables, records, and/or arrays. |
| Menu object | The DDL equivalent is a menu, which organizes parameters, methods, and other items specified in the DDL into a hierarchical structure. A host application may use the menu items to display information to the user in an organized and consistent fashion. |
| MenuItems collection object ("MenuItem") | The DDL equivalent is a collection of menus items. The items of a menu specify the items associated with the menu plus an optional qualifier. |
| Menus collection object ("Menu") | The DDL equivalent is a collection of menus. |
| Method object | The DDL equivalent is a method, which describes the execution of complex interactions that must occur between host devices and a field device. |
| Methods collection object ("PreEdit", "PostEdit", and "Method") | The DDL equivalent is a collection of methods. |
| NamedConfig object | There is no DDL equivalent to a NamedConfig object because these objects correspond to blocks that are stored in the FMS database rather than in field devices. |
| Parameters collection object ("Param") | The DDL equivalent is a collection of parameters, which may be records, arrays, or variables. |
| RecordParameter object | The DDL equivalent is a record, which is a logical group of variables. Each variable in the record is assigned a DDL variable name. Each variable may have a different data type. The variables may be referenced from elsewhere in the device description via the report name and the member name. DDL records describe communication record objects. Therefore, from a communication perspective, the individual members of the record are not treated as individual variables, but simply as a group of variable values. |
| RefreshRelation object | The DDL equivalent is a refresh relation, a particular type of relation which allows the host device to make decisions regarding parameter value consistency when a parameter value changes. It specifies a set of block parameters which may need to be refreshed (re-read from the device) whenever a block parameter from another set is modified. A block parameter can have a refresh relationship with itself, implying that the block parameter must be read after writing. Occasionally writing a block parameter to a field device causes the field device to update the values of other block parameters. If the additional updated block parameters are dynamic, there is no conflict because the host device should re-read the parameter values from a failed device each time the values are needed. However, host devices may cache the |

-continued

The following table explains the correspondence between the OLE hierarchy described above and the related constructs in the DDL. As used in the table, the term "Host device" means an FMS system or an FMS application. Further, the actual keywords employed by a particular DDL may vary, and the proper keywords for a particular DDL will be provided in the specification provided for that DDL. The following table is based on the Fieldbus Device Description Language, which is similar to the HART Device Description Language.

| OLE OBJECT (Lower Hierarchy) | DDL EQUIVALENT |
|---|---|
| | values of static block parameters. Therefore, for host devices to maintain the correct values of all static block parameters, they need to know when the field device is changing its values. |
| RefreshRelations collection object ("Refresh") | The DDL equivalent is a collection of refresh relations. |
| RelationItems collection object ("Units", "Members", "Left", and "Right") | The DDL equivalent is a collection of parameters, which may be variables, records, and/or arrays. |
| ResponseCode object | The DDL equivalent is a response codes, which specifies the values a field device may return as application-specific errors. Each variable, record, array, variable list program, or domain can have its own set of response codes, because each one is eligible for FMS services. |
| ResponseCodes collection object ("RespCode") | The DDL equivalent is a collection of response codes. |
| UnitRelation object | The DDL equivalent is a unit relation, which specifies a units code parameter and the block parameters with those units. When a units code parameter is modified, the block parameter having that units code should be refreshed. In this respect, a unit relation is exactly like a refresh relation. In addition, when a block parameter with a units code is displayed, the value of its units code will also be displayed. |
| UnitRelations collection object ("Unit") | The DDL equivalent is a collection of unit relations. |
| VariableParameter object | The DDL equivalent is a variable, which describes data contained in a device. |
| WriteAsOne Relation object | The DDL equivalent is a write-as-one relation, which informs the host device that a group of block parameters needs to be modified as a group. This relation does not necessarily mean the block parameters are written to the field device at the same time. Not all block parameters sent to the field device at the same time are necessarily part of a write-as-one relation. If a field device requires specific block parameters to be examined and modified at the same time for proper operation, a write-as-one relation is required. |
| WriteAsOneRelations collection object ("WAO") | The DDL equivalent is a collection of write-as-one relations. |

OLE OBJECT DEFINITIONS

The following tables illustrate the properties and methods of the various OLE objects and collection objects in the lower hierarchy illustrated in FIG. 4. The various properties of those objects and collection objects are not included in the following table, but those properties correspond to the attributes of the DDL objects which are equivalents of the objects. The DDL equivalents of the OLE objects and collection objects are identified in the OLE object DDL equivalents table, and are fully described in the ISP Fieldbus DDL specification document, incorporated by reference herein.

The following tables use the following symbols to denote the following information:

| | |
|---|---|
| (R) | Access the property via the Read/Write and Get/Set methods. |
| (†) | Read/Write. |
| (††) | Read/Write in devices less than Rev. 5; otherwise, read-only. |
| (M) | Run this method by executing the OLE method called "Method" or "CallMethod" |
| (N) | Not implemented. |
| (C) | Access this property via an OLE property. Get method, or a Read request containing only this property. |

The values referenced in the Return Type column indicate the following VARIANT types:

| | |
|---|---|
| VT_EMPTY | Used when no value is available. |
| VT_I4 | Used for integer values and boolean values. |
| VT_R4 | Used for most floating point field measurement values. |
| VT_R8 | Used for double precision measurement values. |
| VT_DATE | Used for dates and times using double precision. |
| VT_BSTR | Used for character strings. |
| VT_ERROR | Used for error codes. |
| VT_ARRAY | Used for binary values. |

All objects defined in this table have the set of Standard Properties listed below.

Standard Properties

| Property Name | Return Type | Description |
|---|---|---|
| Kind (R) | VT_I4 | Returns the object's kind. |
| KinAsString (R) | VT_BSTR | Returns the object's kind as a string. |
| Moniker (P) | VT_BSTR | Returns a full moniker for the object. |

ArrayParameter Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The parameter's (or record member's) name. |
| MemberId (R) | VT_I4 | The parameter's (or record member's) member ID. |

| | | | |
|---|---|---|---|
| ItemId (R) | VT_I4 | The array's item ID; | |
| ParamIndex (R) | VT_I4 | The parameter's (or array element's) index. | |
| ParamLabel (R) | VT_BSTR | The parameter-specific label. | |
| Label (R) | VT_BSTR | The array-specific label. | |
| ParamHelp (R) | VT_BSTR | The parameter-specific help. | |
| Help (R) | VT_BSTR | The array-specific help. | |
| NumberOfElements (R) | VT_I4 | The number of elements in the array. | |

| Method Name | Return Type | Description |
|---|---|---|
| Item | VT_DISPATCH | Takes one argument of type VT_BSTR and returns one of the collections provided by the object.<br>Collections:<br>The "Element" collection is an Elements collection and contains the array's elements.<br>The "RespCode" collection is a ResponseCodes collection and contains the array's response codes. |
| _NewEnum | VT_UNKNOWN | Returns the IUnknown interface of an object that implements the IEnumVariant interface. |

Block Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The block's name. |
| ItemId (R) | VT_I4 | The block's item id. |
| Label (R) | VT_BSTR | The block's label. |
| Help (R) | VT_BSTR | The block's help. |
| Tag (R) | VT_BSTR | The block's internal tag.<br>Note:<br>For a HART block, this is the HART tag. |
| BlockTag (R) | VT_BSTR | The block's external tag. |
| PhysicalTag (R) | VT_BSTR | The internal tag of the device in which the block resides.<br>Note:<br>For a HART device, this is the HART tag. |
| DeviceTag (R) | VT_BSTR | The external tag of the device in which the block resides. |
| DeviceId (R) | VT_BSTR | The unique identifier of the device in which the block resides. |
| NetAddress (R) | VT_BSTR | The network address, as a moniker, of the device in which the block resides. |
| StationAddress (R) | VT_I4 | The station address of the device in which the block resides. |

| Method Name | Return Type | Description |
|---|---|---|
| Item | VT_DISPATCH | Takes one argument of type VT_BSTR and returns one of the collections provided by the object.<br>Collections:<br>The "Param" collection is a Parameters collection and contains the block's parameters.<br>The "Database" collection is a DatabaseParameters collection and contains the database parameters for the block.<br>The "Method" collection is a Methods collection and contains the block's methods.<br>The "Menu" collection is a Menus collection and contains the block's menus.<br>The "EditDisplay" collection is an EditDisplays collection and contains the block's edit displays.<br>The "ItemArray" collection is an ItemArrays collection and contains the block's item arrays.<br>The "Collection" collection is a Collections collection and contains the block's collections.<br>The "Refresh" collection is a RefreshRelations collection and contains the block's refresh relations.<br>The "Unit" collection is a UnitRelations collection and contains the block's unit relations.<br>The "WAO" collection is a WriteAsOneRelations collection and contains the block's write as one relations. |
| _NewEnum | VT_UNKNOWN | Returns the IUnknown interface of an object that implements the IEnumVariant interface. |
| Invalidate (M) | VT_EMPTY | Invalidates the parameters in the parameter cache. This method is used to force all the parameters to be re-read from the device. |
| SendCommand (M) | VT_EMPTY | Sends a HART command. Takes two arguments of type VT_I4 which specify the command number and the transaction number. |
| SendContinuous Command (M) | VT_EMPTY | Sends two HART commands continuously. Takes six arguments of type VT_I4. The first three arguments specify the first command to be sent and the last three arguments specify the second command to sent. The first and fourth arguments specify command numbers, the second and fifth arguments specify transaction numbers, and the third and sixth arguments specify the number of times to send the specified commands. |
| FindResponseCode (M) | VT_BSTR | Returns the string associated with a response code of a HART command. Takes three arguments of type VT_I4 which specify the command number, the transaction number and the response code value. |

BlockTag Collection

| Property Name | Return Type | Description |
| --- | --- | --- |
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
| --- | --- | --- |
| Item | VT_DISPATCH | Takes one argument of type VT_BSTR and returns one of the items in the collection. The Block object whose BlockTag property matches the argument is returned. |
| _NewEnum (N) | VT_UNKNOWN | Returns the IUnknown interface of an object that implements the IEnumVariant interface. |

Collections Collection

| Property Name | Return Type | Description |
| --- | --- | --- |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
| --- | --- | --- |
| Item | VT_DISPATCH | Takes one argument of type VT_BSTR and returns one of the items in the collection. If the argument begins with a $, the rest of the string must take the form of an integer. The DDL collection whose ItemId property matches the argument is returned. If the argument begins with a digit, the string must take the form of an integer and the DDL collection whose Index property matches the argument is returned. Otherwise, the DDL collection whose Name property matches the argument is returned. |
| _NewEnum | VT_UNKNOWN | Returns the IUnknown interface of an object that implements the IEnumVariant interface. |

CollectionItems Collection

| Property Name | Return Type | Description |
| --- | --- | --- |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
| --- | --- | --- |
| Item | VT_DISPATCH | Takes one argument of type VT_BSTR and returns one of the items in the collection. If the argument begins with a $, the rest of the string must take the form of an integer. The item whose ItemMemberID property matches the argument is returned. Otherwise, the item whose ItemName property matches the argument is returned. |
| _NewEnum | VT_UNKNOWN | Returns the IUnknown interface of an object that implements the IEnumVariant interface. |

CollectionItem Object

| Property Name | Return Type | Description |
| --- | --- | --- |
| ItemName (R) | VT_BSTR | The collection item's member name. |
| ItemMemberId (R) | VT_I4 | The collection item's member ID. |
| ItemLabel (R) | VT_I4 | The collection item's label. |
| ItemHelp (R) | VT_BSTR | The collection item's help. |

Collection Object

| Property Name | Return Type | Description |
| --- | --- | --- |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The collection's name. |
| ItemId (R) | VT_I4 | The collection's item ID. |
| Index (R) | VT_I4 | The collection's index. |
| Label (R) | VT_BSTR | The collection's label. |
| Help (R) | VT_BSTR | The collection's help. |
| Type (R) | VT_I4 | The collection's type. |

-continued

| TypeAsString (R) | VT_BSTR | The collection's type as a string. |
|---|---|---|
| Method Name | Return Type | Description |
| Item | VT_DISPATCH | Takes one argument of type VT_BSTR and returns one of the collections provided by the object.<br>Collections:<br>The "Member" collection is a CollectionItems collection and contains the members of the DDL collection. |
| _NewEnum | VT_UNKNOWN | Returns the IUnknown interface of an object that implements the IEnumVariant interface. |

DatabaseParameter Object

| Property Name | Return Type | Description |
|---|---|---|
| Name (R) | VT_BSTR | The parameter's name. |
| Value (R) (†) | VT_VARIANT | The parameter's value. |
| ValueAsString (R) (†) | VT_BSTR | The parameter's value as a string. |
| Size (R) | VT_I4 | The parameter's size (in bytes). |
| Type (R) | VT_I4 | The parameter's type. |
| TypeAsString (R) | VT_BSTR | The parameter's type as a string. |

DatabaseParameter Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be stressed without blocking, which may be less than the total number of items in the collection. |
| ServerCount (N) | VT_I4 | Same as the Count property except it does not block if all the items are not immediately available. |
| Method Name | Return Type | Description |
| Item | VT_DISPATCH | Takes one argument of type VT_BSTR and returns one of the items in the collection.<br>The DatabaseParameter object whose Name property matches the argument is returned. |
| _NewEnum | VT_UNKNOWN | Returns the IUnknown interface of an object that implements the IEnumVariant interface. |

DeviceID Collection

| Property Name | Return Type | Description |
|---|---|---|
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | Return Type | Description |
| Item | VT_DISPATCH | Takes one argument of type VT_BSTR and returns one of the items in the collection.<br>The Device object whose DeviceID property matches the argument is returned. |
| _NewEnum (N) | VT_UNKNOWN | Returns the IUnknown interface of an object that implements the IEnumVariant interface. |

Device Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| PhysicalTag (R) (†) | VT_BSTR | The device's internal tag.<br>Note:<br>For a HART device, this is the HART tag. |
| DeviceTag (R) | VT_BSTR | The device's external tag. |
| DeviceID (R) († †) | VT_BSTR | The device's unique identifier. |
| StationAddress (R) (†) | VT_I4 | The device's station address. |
| NetAddress (R) | VT_BSTR | The device's network address as a moniker. |
| Method Name | Return Type | Description |
| Item | VT_DISPATCH | Takes one argument of type VT_BSTR and returns one of the collections provided by the object.<br>Collections:<br>The "Tag" collection is a Tag collection and contains all the device's blocks.<br>Special Case:<br>If the argument is "HART," the IDispatch interface of the device's Block object is returned. |
| _NewEnum | VT_UNKNOWN | Returns the IUnknown interface of an object that implements the IEnumVariant interface. |

DeviceTag Collection

| Property Name | Return Type | Description |
|---|---|---|
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The Device object whose DeviceTag property matches the argument is returned. |
| _NewEnum (N) | VT_UNKNOWN | Returns the IUnknown interface of an object that implements the IEnumVariant interface. |

EditDisplayItems Collections

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The argument must take the form of an integer and the item whole Index property matches the argument is returned. |
| _NewEnum | VT_UNKNOWN | Returns the IUnknown interface of an object that implements the IEnumVariant interface. |

EditDisplays Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a $, the rest of the string must take the form of an integer. The edit display whose ItemId property matches the argument is returned. If the argument begins with a digit, the string must take the form of an integer and the edit display whose Index property matches the argument is returned. Otherwise, the edit display whose Name property matches the argument is returned. |
| _NewEnum | VT_UNKNOWN | Returns the IUnknown interface of an object that implements the IEnumVariant interface. |

EditDisplay Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than all the items in the collection. |
| ServerCount (N) | VT_I4 | Same as the Count property except it does not block if all the items are not immediately available. |
| Name (R) | VT_BSTR | The edit display's name. |
| ItemId (R) | VT_I4 | The edit display's item ID. |
| Index (R) | VT_I4 | The edit display's index. |
| Label (R) | VT_BSTR | The edit display's label. |

| Method Name | Return Type | Description |
|---|---|---|
| Item | VT_DISPATCH | Takes an argument of type VT_BSTR and returns one collection of the object. Collections: The "Edit" collection is an EditDisplayItems collection and contains the edit display's edit items. The "Display" collection is an EditDisplayItems collection and contains the edit display's display items. The "PreEdit" collection is a Methods collection and contains the edit display's pre-edit methods. The "PostEdit" collection is a |

-continued

| | | |
|---|---|---|
| | | Methods collection and contains the edit display's post-edit methods. |
| _NewEnum | VT_UNKNOWN | Returns the IUnknown interface of an object that implements the IEnumVariant interface. |
| ExecutePreEdit | VT_EMPTY | Executes the edit display's pre-edit methods. |
| ExecutePostEdit | VT_EMPTY | Executes the edit display's post-edit methods. |

Elements Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a $, the rest of the string must take the form of an integer. The element whose ItemId property matches the argument is returned. Otherwise, the string must take the form of an integer. The element whose ParamIndex property equals this integer is returned. |
| _NewEnum | VT_UNKNOWN | Returns the IUnknown interface of an object that implements the IEnumVariant interface. |

EnumerationValue Object

| Property Name | Return Type | Description |
|---|---|---|
| Count (C) | VT_I4 | The number of items of the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Description (R) | VT_BSTR | The enumeration value's description. |
| Value (R) | VT_I4 | The enumeration value. |
| Help (R) | VT_BSTR | The enumeration value's help. |
| Class (R) | VT_I4 | The enumeration value's class. |

-continued

| | | |
|---|---|---|
| ClassAsString (R) | VT_BSTR | The enumeration value's class as a string. |
| StatusClasses (R) | VT_I4 | The enumeration value's status classes. |
| StatusClassesAsString (R) | VT_BSTR | The enumeration value's status classes as a string. |

| Method Name | Return Type | Description |
|---|---|---|
| Item | VT_DISPATCH | Takes one argument of type VT_BSTR and returns one of the collections provided by the object. Collections: The "Member" collection is a CollectionItems collection and contains the members of the DDL collection. |
| _NewEnum | VT_UNKNOWN | Returns the IUnknown interface of an object that implements the IEnumVariant interface. |
| ExecuteActions | VT_EMPTY | Executes the enumeration value's actions method. |

EnumerationValues Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the collection. |
| ServerCount (R) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a digit, the string must take the form of an integer and the enumeration value whose Value property matches the argument is returned. Otherwise, the enumeration value whose Description property matches the argument is returned. |
| _NewEnum | VT_UNKNOWN | Returns the IUnknown interface of an object that implements the IEnumVariant interface. |

HIU Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the |

-continued

| | | |
|---|---|---|
| ServerCount (N) | VT_I4 | total number of items in the collection. Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The argument must take the form of an integer and the Interchange object whose StationAddress property matches the argument is returned. |
| _NewEnum | VT_UNKNOWN | Returns the IUnknown interface of an object that implements the IEnumVariant interface. |

Interchange Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Tag (R) (†) | VT_BSTR | The HART Interchange's HART tag. |
| DeviceID (R) | VT_BSTR | The HART Interchange's unique identifier. |
| NetAddress (R) | VT_BSTR | The HART Interchange's network address as a moniker. |
| StationAddress (R) | VT_I4 | The HART Interchange's station address. |

| Method Name | Return Type | Description |
|---|---|---|
| Item | VT_DISPATCH | Returns the IDispatch interface of the specified device on the Instrument List. This method takes one argument which is a loop number, 0–31 inclusive. Or "Block," which returns the IDISPATCH interface to the Block Object that describes the HIU itself. |
| _NewEnum | VT_UNKNOWN | Returns the IUnknown interface of an object that implements the IEnumVariant interface. |

ItemArray Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be assessed without blocking, which may be less an the total number of items in the collection. |
| ServerCount (N) | VT_I4 | Same as the Count property except it does not block if all the items are not immediately available. |
| Name (R) | VT_BSTR | The item array's name. |
| ItemId (R) | VT_I4 | The item array's item ID. |
| Index (R) | VT_I4 | The item array's index. |
| Label (R) | VT_BSTR | The item array's label. |
| Help (R) | VT_BSTR | The item array's help. |
| Type (R) | VT_I4 | The item array's type. |
| TypeAsString (R) | VT_BSTR | The item array's type as a string. |

| Method Name | Return Type | Description |
|---|---|---|
| Item | VT_DISPATCH | Takes one argument of type VT_BSTR and returns one of the collections provided by the object. Collections: The "Element" collection is an ItemArrayItems collection and contains the elements of the item array. |
| _NewEnum | VT_UNKNOWN | Returns the IUnknown interface of an object that implements the IEnumVariant interface. |

ItemArray Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. if the argument begins with a $, the rest of the string must take the form of an integer. The item array whose ItemId property matches the argument is returned. If the argument begins with a digit, the string must take the form of an integer and the item array whose Index property matches the argument is returned. Otherwise, the item array whose Name property matches the argument is returned. |

-continued

| | | |
|---|---|---|
| _NewEnum | VT_UNKNOWN | Returns the IUnknown interface of an object that implements the IEnumVariant interface. |

ItemArrayItem Object

| Property Name | Return Type | Description |
|---|---|---|
| ItemIndex (R) | VT_BSTR | The item array item's index. |
| ItemLabel (R) | VT_I4 | The item array item's label. |
| ItemHelp (R) | VT_BSTR | The item array item's help. |

ItemArrayItems Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The argument must take the form of an integer and the item whose ItemIndex property matches the argument is returned. |
| _NewEnum | VT_UNKNOWN | Returns the IUnknown interface of an object that implements the IEnumVariant interface. |

Members Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. If the argument begins with a $, the rest of the string must take the form of a DDID (an integer). If the DDID is an item ID, the member whose ItemId property matches the argument is returned. If the DDID is a member ID, the member whose MemberId property matches the argument is returned. If the argument begins with a digit, the string must take the form of an integer and the parameter whose ParamIndex property matches the argument is returned. Otherwise, the parameter whose Name property matches the argument is returned. |
| _NewEnum | VT_UNKNOWN | Returns the IUnknown interface of an object that implements the IEnumVariant interface. |

MenuItems Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The argument must take the form of an integer and the item whose Index property matches the argument is returned. |
| _NewEnum | VT_UNKNOWN | Returns the IUnknown interface of an object that implements the IEnumVariant interface. |

MenuItem Object

| Property Name | Return Type | Description |
|---|---|---|
| Flags (R) | VT_I4 | The menu item's flags. |
| FlagsAsString (R) | VT_BSTR | The menu item's flags as a string. |

Menu Object

| Property Name | Return Type | Description |
|---|---|---|
| Count (C) | VT_I4 | The number of items in the collection. This property blocks until all the items in the collection can be accessed without blocking. |

-continued

| | | |
|---|---|---|
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The menu's name. |
| ItemId (R) | VT_I4 | The menu's item id. |
| Index (R) | VT_I4 | The menu's index. |
| Label (R) | VT_BSTR | The menu's label. |

| Method Name | Return Type | Description |
|---|---|---|
| Item | VT_DISPATCH | Takes one argument of type VT_BSTR and returns one of the collections provided by the object.<br>Collections:<br>The "MenuItem" collection is a MenuItems collection and contains the items of the menu. |
| _NewEnum | VT_UNKNOWN | Returns the IUnknown interface of an object the implements the IEnumVariant interface. |

Menus Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection.<br>If the argument begins with a $, the rest of the string must take the form of an integer. The menu whose ItemId property matches the argument is returned.<br>If the argument begins with a digit the string must take the form of an integer and the menu whose Index property matches the argument is returned.<br>Otherwise, the menu whose Name property matches the argument is returned. |
| _NewEnum | VT_UNKNOWN | Returns the IUnknown interface of an object that implements the IEnumVariant interface. |

Methods Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection.<br>If the argument begins with a $, the rest of the string must take the form of an integer. The method whose ItemId property matches the argument is returned.<br>If the argument begins with a digit, the string must take the form of an integer and the method whose Index property matches the argument is returned.<br>Otherwise, the method whose Name property matches the argument is returned. |
| _NewEnum | VT_UNKNOWN | Returns the IUnknown interface of an object that implements the IEnumVariant interface. |

Method Object

| Property Name | Return Type | Description |
|---|---|---|
| Name (R) | VT_BSTR | The method's name. |
| ItemID (R) | VT_I4 | The method's item ID. |
| Index (R) | VT_I4 | The method's index. |
| Class (R) | VT_I4 | The method's class. |
| ClassAsString (R) | VT_BSTR | The method's class as a string. |
| Definition (R) | VT_BSTR | The method's definition. |
| Label (R) | VT_BSTR | The method's label. |
| Help (R) | VT_BSTR | The method's help. |
| Validity (R) | VT_I4 | The method's validity. |

| Method Name | Return Type | Description |
|---|---|---|
| Execute | VT_EMPTY | Executes the method. |

Modem Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the |

|  |  | total number of items in the collection. |
|---|---|---|
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The argument must take the form of an integer and the Device object whose StationAddress property matches the argument is returned. |
| _NewEnum | VT_UNKNOWN | Returns the IUnknown interface of an object that implements the IEnumVariant interface. |

NamedConfigs Collection

| Property Name | Return Type | Description |
|---|---|---|
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |

| Method Name | Return Type | Description |
|---|---|---|
| Item | VT_DISPATCH | Takes one argument of type VT_BSTR and returns one of the items in the collection. The NamedConfig object whose Name property matches the argument is returned. |
| _NewEnum (N) | VT_UNKNOWN | Returns the IUnknown interface of an object that implements the IEnumVariant interface. |

NamedConfig Object

| Property Name | Return Type | Description |
|---|---|---|
| Count (C) | VT_I4 | The the number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The configuration's name. |
| Label (R) | VT_BSTR | The configuration's label. |
| Help (R) | VT_BSTR | The configuration's help. |
| Tag (R) | VT_BSTR | If set, the configuration only applies to a block with the specified internal tag. |
| BlockTag (R) | VT_BSTR | If set, the configuration only applies to a block with the specified external tag. |
| PhysicalTag (R) | VT_BSTR | If set, the configuration only applies to a device with the specified internal tag. |
| DeviceTag (R) | VT_BSTR | If set, the configuration only applies to a device with the specified external tag. |
| DeviceID (R) | VT_BSTR | If set, the configuration only applies to a device with the specified unique identifier. |

| Method Name | Return Type | Description |
|---|---|---|
| Item | VT_DISPATCH | Takes one argument of type VT_BSTR and returns one of the collections provided by the object. Collections: The "Param" collection is a Parameters collection and contains the block's parameters. The "Database" collection is a DatabaseParameters collection and contains the database parameters for the block. The "Method" collection is a Methods collection and contains the block's methods. The "Menu" collection is a Menus collection and contains the block's menus. The "EditDisplay" collection is an EditDisplays collection and contains the block's edit displays. The "ItemArray" collection is an ItemArrays collection and contains the block's item arrays. The "Collection" collection is a Collections collection and contains the block's collections. The "Refresh" collection is a RefreshRelations collection and contains the block's refresh relations. The "Unit" collection is a UnitRelations collection and contains the block's unit relations. The "WAO" collection is a WriteAsOneRelations collection and contains the block's write as one relations. |
| _NewEnum | VT_UNKNOWN | Returns the IUnknown interface an object that implements the IEnumVariant interface. |

Net Collection

| Property Name | Return Type | Description |
|---|---|---|
| Count (C) | VT_I4 | The number of items in the collection. This property |

-continued

| | Return Type | Description |
|---|---|---|
| ReadyCount (C) | VT_I4 | blocks until all the items in the collection can be accessed without blocking. The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The NetNode object whose Name property matches the argument is returned. |
| _NewEnum | VT_UNKNOWN | Returns the IUnknown interface of an object that implements the IEnumVariant interface. |

NetNode Object

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The node's TCP/IP node name. |
| Address (R) | VT_BSTR | The node's TCP/IP address in dot address format. |
| Method Name | | |
| Item | VT_DISPATCH | Takes one argument of type VT_BSTR and returns one of the collections provided by the object. Collections: - port name (returns a Port collection, e.g., COM1 or COM2) Note: In the future, access to the RS3, PROVOX, and HAWK control systems will also be provided. |
| _NewEnum | VT_UNKNOWN | Returns the IUnknown interface of an object that implements the IEnumVariant interface. |

Parameters Collection

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a $, the rest of the string must take the form of a DDID (an integer). If the DDID is an item id, the parameter whose ItemId property matches the argument is returned. If the DDID is a MemberId, the parameter whose MemberId property matches the argument is returned. If the argument begins with a digit, the string must take the form of an integer and the parameter whose ParamIndex property matches the argument is returned. Otherwise, the parameter whose Name property matches the argument is returned. |
| _NewEnum | VT_UNKNOWN | Returns the IUnknown interface of an object that implements the IEnumVariant interface. |

PhysicalTag Collection

| | Return Type | Description |
|---|---|---|
| Property Name | | |
| Count (N) | VT_I4 | The number of items in the collection. This property blocks until all the items in the collection can be accessed without blocking. |
| ReadyCount (N) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. |

-continued

|  | Return Type | Description |
|---|---|---|
| _NewEnum (N) | VT_UNKNOWN | The Device object whose PhysicalTag property matches the argument is returned. Returns the IUnknown interface of an object that implements the IEnumVariant interface. |

Port Collection

|  | Return Type | Description |
|---|---|---|
| Property Name |  |  |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name |  |  |
| Item | VT_DISPATCH | Takes one argument of type VT_BSTR and returns one of the collections provided by the object. Collections: The "HIU" collection is a HIU collection and contains all the HART interchanges accessible via the port. The "Modem" collection is a Modem collection and contains all the HART devices accessible via the port. |
| _NewEnum | VT_UNKNOWN | Returns the IUnknown interface of an object that implements the IEnumVariant interface. |

RecordParameter Object

|  | Return Type | Description |
|---|---|---|
| Property Name |  |  |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The parameter's (or record member's) name. |
| MemberId (R) | VT_I4 | The parameter's (or record member's) member id. |
| ItemId (R) | VT_I4 | The record's item id. |

|  | Return Type | Description |
|---|---|---|
| ParamIndex (R) | VT_I4 | The parameter's (or array element's) index. |
| ParamLabel (R) | VT_BSTR | The parameter-specific label. |
| Label (R) | VT_BSTR | The record-specific label. |
| ParamHelp (R) | VT_BSTR | The parameter-specific help. |
| Help (R) | VT_BSTR | The record-specific help. |
| Method Name |  |  |
| Item | VT_DISPATCH | Takes one argument of type VT_BSTR and returns one of the collections provided by the object. Collections: The "Member" collection is a Members collection and contains the record's members. The "RespCode" collection is a ResponseCodes collection and contains the record's response codes. |
| _NewEnum | VT_UNKNOWN | Returns the IUnknown interface of an object that implements the IEnumVariant interface. |

RefreshReLation Object

|  | Return Type | Description |
|---|---|---|
| Property Name |  |  |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Name (R) | VT_BSTR | The refresh relation's name. |
| ItemId (R) | VT_I4 | The refresh relation's item ID. |
| Index (R) | VT_I4 | The refresh relation's index. |
| Method Name |  |  |
| Item | VT_DISPATCH | Takes one argument of type VT_BSTR and returns one of the collections provided by the object. Collections: The "Left" collection is a RelationItems collection and contains the parameters on the left side of the refresh relation. The "Right" collection is a RelationItems collection and contains the parameters on the right side of the refresh relation. |
| _NewEnum | VT_UNKNOWN | Returns the IUnknown interface of an object that implements the IEnumVariant interface. |

RefreshRelations Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. If the argument begins with a $, the rest of the string must take the form of an integer. The refresh relation whose ItemId property matches the argument is returned. If the argument begins with a digit, the string must take the form of an integer and the refresh relation whose Index property matches the argument is returned. Otherwise, the refresh relation whose Name property matches the argument is returned. |
| _NewEnum | VT_UNKNOWN | Returns the IUnknown interface of an object that implements the IEnumVariant interface. |

ResponseCode Object

| Property Name | Return Type | Description |
|---|---|---|
| Value (R) | VT_I4 | The response code's value. |
| Type (R) | VT_I4 | The response code's type. |
| Description (R) | VT_BSTR | The response code's description. |
| Help (R) | VT_BSTR | The response code's help. |

RelationItems Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Same as the Count property except it does not block if all the items are not immediately available. |
| Method Name | | |
| Item | VT_DISPATCH | Takes one argument of type VT_BSTR and returns one of the items in the collection. The argument must take the form of an integer and the item whose Index property matches the argument is returned. |
| _NewEnum | VT_UNKNOWN | Returns the IUnknown interface of an object that implements the IEnumVariant interface. |

ResponseCodes Collection

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Method Name | | |
| Item | VT_DISPATCH | Takes one argument of type VT_BSTR and returns one of the items in the collection. The argument must take the form of an integer and the response code whose Value property matches the argument is returned. |
| _NewEnum | VT_UNKNOWN | Returns the IUnknown interface of an object that implements the IEnumVariant interface. |

Root Object

| Property Name | Return Type | Description |
|---|---|---|
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |

-continued

| Method Name | Return Type | Description |
|---|---|---|
| Item | VT_DISPATCH | Takes one argument of type VT_BSTR and returns one of the collections provided by the object.<br>Collections:<br>The "NamedConfig" collection is a NamedConfig collection and contains all the named configurations, 275 configurations, and device templates.<br>The "BlockTag" collection is a BlockTag collection and contains all the blocks in the database organized by tag.<br>The "DeviceID" collection is a DeviceID collection and contains all the devices in the database organized by unique identifier.<br>The "DeviceTag" collection is a DeviceTag collection and contains all the devices in the database organized by tag.<br>The "PhysicalTag" collection is a PhysicalTag collection and contains all the devices in the database organized by HART tag.<br>The "Net" collection is a Net collection and contains all the TCP/IP nodes. |
| _NewEnum | VT_UNKNOWN | Returns the IUnknown interface of an object that implements the IEnumVariant interface. |

Tag Collection

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Method Name | | |
| Item | VT_DISPATCH | Takes one argument of type VT_BSTR and returns one of the items in the collection. The Block object whose Tag property matches the argument is returned. |
| _NewEnum | VT_UNKNOWN | Returns the IUnknown interface of an object that implements the IEnumVariant interface. |

UnitRelation Object

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Name (R) | VT_BSTR | The unit relation's name. |
| ItemId (R) | VT_I4 | The unit relation's item ID. |
| Index (R) | VT_I4 | The unit relation's index. |
| Method Name | | |
| Item | VT_DISPATCH | Takes one argument of type VT_BSTR and returns one of the collections provided by the object.<br>Collections:<br>The "Units" collection is a RelationItems collection and contains the parameter on the left side of the unit relation.<br>The "Member" collection is a RelationItems collection and contains the parameters on the right side of the unit relation. |
| NewEnum | VT_UNKNOWN | Returns the IUnknown interface of an object that implements the IEnumVariant interface. |

UnitRelations Collection

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Method Name | | |
| Item | VT_DISPATCH | Takes one argument of type VT_BSTR and returns one of the items in the collection. If the argument begins with a $, the rest of the string must take the form of an integer. The unit relation whose ItemId property matches the argument is returned. If the argument begins with a |

-continued

| | Return Type | Description |
|---|---|---|
| _NewEnum | VT_UNKNOWN | digit, the string must take the form of an integer and the unit relation whose Index property matches the argument is returned. Otherwise, the unit relation whose Name property matches the argument is returned. Returns the IUnknown interface of an object that implements the IEnumVariant interface. |

VariableParameter Object

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Name(R) | VT_BSTR | The parameter's (or record member's) name. |
| MemberId (R) | VT_I4 | The parameter's (or record member's) member id. |
| ItemId (R) | VT_I4 | The variable's item id. |
| ParamIndex (R) | VT_I4 | The parameter's (or array element's) index. |
| Value (†) (R) | VT_VARIANT | The parameter's value. |
| ValueAsString(†) (R) | VT_BSTR | The parameter's value as a string. |
| Type (R) | VT_I4 | The parameter's type. |
| TypeAsString (R) | VT_BSTR | The parameter's type as a string. |
| Size (R) | VT_I4 | The parameter's size (in bytes). |
| ParamLabel (R) | VT_BSTR | The parameter-specific label. |
| Label (R) | VT_BSTR | The variable-specific label. |
| ParamHelp (R) | VT_BSTR | The parameter-specific help. |
| Help (R) | VT_BSTR | The variable-specific help. |
| Class (R) | VT_I4 | The parameter's class. |
| ClassAsString (R) | VT_BSTR | The parameter's class as a string. |
| Handling (R) | VT_I4 | Returns the parameter's handling. |
| HandlingAsString (R) | VT_BSTR | The parameter's handling as a string. |
| ReadTimeout (R) | VT_I4 | The parameter's read time-out. |
| WriteTimeout (R) | VT_I4 | The parameter's write time-out. |
| DisplayFormat (R) | VT_BSTR | The parameter's display format. |
| EditFormat (R) | VT_BSTR | The parameter's edit format. |
| MinCount (R) | VT_I4 | The number of min values. |
| MaxCount (R) | VT_I4 | The number of max values. |
| MinValueN (R) | VT_VARIANT | One of the, parameter's min values. N indicates which min value is to be returned and must take the form of an integer. |
| MaxValueN (R) | VT_VARIANT | One of the parameter's max values. N indicates which max value is to be returned and |

-continued

| | Return Type | Description |
|---|---|---|
| EnumDescription (R) | VT_BSTR | must take the form of an integer. The Description property of the Enumeration Value corresponding to the current value of the parameter. This property is only meaningful if the parameter's type is ENUMERATED. |
| EnumHelp (R) | VT_BSTR | The Help property of the Enumeration Value corresponding to the current value of the parameter. This property is only meaningful if the parameter's type is ENUMERATED. |
| Units (R) | VT_BSTR | The parameter's units. |
| Validity (R) | VT_I4 | The parameter's validity. |
| IndexItemArray (R) | VT_I4 | The Item ID of the Item Array which this variable indexes, if this variable is of type Index. |
| Method Name | | |
| Item | VT_DISPATCH | Takes one argument of type VT_BSTR and returns one of the collections provided by the object. Collections: The "Enum" collection is an EnumerationValues collection and contains the parameter's enumeration values. The "RespCode" collection is a ResponseCodes collection and contains the parameter's response codes. The "PreEdit" collection is a Methods collection and contains the parameter's pre-edit methods. The "PostEdit" collection is a Methods collection and contains the parameter's post-edit methods. The "IndexedItemArray" collection is an ItemArray object which corresponds to the ItemArray parameter, if this variable is of type Index. |
| _NewEnum | VT_UNKNOWN | Returns the IUnknown interface of an object that implements the IEnumVariant interface. |
| ExecutePreEdit | VT_EMPTY | Executes the parameter's pre-edit methods. |
| ExecutePostEdit | VT_EMPTY | Executes the parameter's post-edit methods. |

WriteAsOneRelation Object

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, |

-continued

| | Return Type | Description |
|---|---|---|
| ServerCount (N) | VT_I4 | which may be less than the total number of items in the collection. Sample as the Count property except it does not block if all the items are not immediately available. |
| Name (R) | VT_BSTR | The write as one relation's name |
| ItemId (R) | VT_I4 | The write as one relation's item ID. |
| Index (R) | VT_I4 | The write as one relation's index. |
| Method Name | | |
| Item | VT_DISPATCH | Takes one argument of type VT_BSTR and returns one of the items in the collection. Collections: The "Member" collection is a RelationItems collection and contains the parameters of the write as one relation. |
| _NewEnum | VT_UNKNOWN | Returns the IUnknown interface of an object that implements the IEnumVariant interface. |

WriteAsOneReLations Collection

| | Return Type | Description |
|---|---|---|
| Property Name | | |
| Count (C) | VT_I4 | The number of items in the collection. This property blocks until all the items in the collection can be accessed without blocking. |
| ReadyCount (C) | VT_I4 | The number of items in the collection that can be accessed without blocking, which may be less than the total number of items in the collection. |
| ServerCount (N) | VT_I4 | Sample as the Count property except it does not block if all the items are not immediately available. |
| Method Name | | |
| Item | VT_DISPATCH | Takes one argument of type VT_BSTR and returns one of the items in the collection. If the argument begins with a $, the rest of aha must take the form of an integer. The write as one relation whose ItemId property matches the argument is returned. If the argument begins with a digit, the string must take the form of an integer and the write as one relation whose Index property matches the argument is returned. Otherwise, the write as one relation whose Name property matches the argument is returned. |
| _NewEnum | VT_UNKNOWN | Returns the IUnknown interface of an object that implements the IEnumVariant interface. |

We claim:

1. A field device management system adapted for communicating with a field device having device data associated therewith and with a device description storing a subset of the device data therein, the system comprising:

means for communicating with the field device;

means for interpreting the device description to obtain the subset of the device data stored therein; means for storing a hierarchy of categories of information associated with the device data, including means associated with each of the categories for defining communication procedures related to the device data associated with that category;

means for initiating a command related to a portion of the device data;

means for categorizing the command as related to one of the categories of the predetermined hierarchy of categories of information; and means responsive to the categorizing means for controlling the communicating means and the interpreting means in accordance with the communication procedures associated with the one of the categories.

2. The field device management system of claim 1, further including a database for storing another portion of the device data, means for interfacing with the database and further means responsive to the categorizing means for controlling the interfacing means in accordance with the communication procedures associated with the one of the categories.

3. The field device management system of claim 2, wherein the another portion of the device data includes data related to a past configuration of the field device.

4. The field device management system of claim 2, wherein the initiating means initiates a command to retrieve device data from one of the field device, the device description and the database.

5. The field device management system of claim 2, wherein the initiating means initiates a command to store device data in one of the field device and the database.

6. The field device management system of claim 2, wherein the initiating means initiates a command to have the field device perform a predefined function.

7. The field device management system of claim 1, wherein the predetermined hierarchy of categories of information includes a category related to the physical connectivity of the field device and includes a category related to the configuration of the field device.

8. The field device management system of claim 1, wherein the field device includes a functional block defining one of an input, an output and a control function of the field device and wherein the predetermined hierarchy of categories of information includes a category defining the block of the field device.

9. The field device management system of claim 1, wherein the predetermined hierarchy of categories of information includes means for specifying the interrelationship between a multiplicity of the categories of information and wherein the controlling means includes means for sending messages between two of the multiplicity of the categories of information according to the specified interrelationship to control the communicating means and the interpreting means.

10. The field device management system of claim 1, wherein the storing means includes means for assigning a moniker to a selected one of the categories based on the position of the selected one of the categories within the hierarchy of categories of information.

11. The field device management system of claim 1, wherein the storing means includes a set of objects in an object-oriented programming paradigm.

12. The field device management system of claim 1, wherein the communicating means includes further means for communicating with the field device through a portable communication device.

13. A device management system adapted to be coupled to a plurality of field devices that perform process control activities in a process environment and that have field device information associated therewith, comprising:
 a library that stores a device description associated with each of the plurality of field devices, wherein each of the device descriptions stores a portion of the field device information comprising a parameter associated with the field device and a property associated with the parameter;
 means for identifying a hierarchy of categories of information using the parameters and the properties associated with the parameters;
 means for communicating with the plurality of field devices based on the hierarchy of categories of information; and
 means for retrieving field device information from the device descriptions based on the hierarchy of categories of information.

14. The device management system of claim 13, further including a database capable of storing another portion of the field device information and means for interfacing with the database based on the hierarchy of categories of information.

15. The device management system of claim 14, wherein the identifying means includes means associated with each of the categories of information for storing field device information associated with that category of information and means associated with each of the categories of information, for defining the operation of the communicating means or the retrieving means or the interfacing means with respect to the field device information associated with that category of information.

16. The device management system of claim 15, wherein the storing means and the defining means comprise a set of objects in an object-oriented programming paradigm.

17. The device management system of claim 13, wherein one of the device descriptions includes field device information related to the communication format of one of the plurality of field devices.

18. The device management system of claim 13, wherein one of the device descriptions includes field device information describing the type of device information stored in one of the plurality of field devices.

19. The device management system of claim 13, wherein one of the device descriptions includes field device information describing the methods available for implementation on one of the plurality of field devices.

20. A system for communicating with a plurality of field devices, each of which has device information associated therewith, comprising:
 a library which stores a device description for each of the plurality of field devices, wherein each of the device descriptions includes a portion of the device information pertaining to one of the plurality of field devices;
 means for communicating with the plurality of field devices and with the device descriptions stored in the library; and
 means for categorizing the device information associated with each of the plurality of field devices into a multiplicity of predetermined categories, wherein each of the multiplicity of predetermined categories includes;
 means for storing device information associated with the category, and
 means for controlling the communicating means with respect to the device information associated with the category.

21. The system of claim 20, further including a database which stores another portion of the device information for one of the plurality of field devices and wherein the communicating means includes means for interfacing with the database.

22. The system of claim 20, wherein the multiplicity of predetermined categories comprises a hierarchy of categories and wherein the categorizing means includes means for defining the interrelationship between each of the categories of the hierarchy of categories of information.

23. The system of claim 22, wherein the hierarchy of categories of information includes a category related to the physical connectivity of each of the plurality of field devices and a category related to the configuration of each of the plurality of field devices.

24. The system of claim 22, wherein the categorizing means includes a category specifying the time to which the device information stored by the storing means of another category is related.

25. The system of claim 20, wherein the categorizing means comprises a set of objects in an object-oriented programming paradigm, wherein each of the set of objects includes an object property and an object method, and wherein the storing means comprises the object properties of the set of objects and the controlling means comprises the object methods of the set of objects.

26. The system of claim 20, wherein each of the device descriptions is written in accordance with a device protocol and wherein the device protocol associated with a first one of the device descriptions is different than the device protocol associated with a second one of the device descriptions.

27. The system of claim 20, wherein each of the plurality of field devices includes a functional block defining one of an input, an output and a control function of the field device and wherein the predetermined hierarchy of categories of device information includes categories defining the functional block of each of the plurality of field devices.

28. A method of communicating with a plurality of field devices having device information associated therewith, comprising the steps of:
 storing a device description for each of the plurality of field devices in a memory, wherein each of the device descriptions stores a portion of the device information;
 identifying a hierarchy of categories of information describing the device information associated with the plurality of field devices and the interrelation between each of the categories of information;
 associating a method of communicating with one of the plurality of field devices or one of the device descriptions for each of a multiplicity of the identified categories of information; and
 using the method of communicating associated with one of the multiplicity of the identified categories of information to communicate with one of the plurality of field devices or one of the device descriptions.

29. The method of claim 28, further including the step of storing another portion of the device information in a database, associating a method of communicating with the database with a further one of the identified categories of information and using the method of communicating associated with the further one of the identified categories of information to communicate with the database.

* * * * *